US012785127B1

(12) United States Patent
(10) Patent No.: US 12,785,127 B1
(45) Date of Patent: Nov. 3, 2026

Adhikari et al.

(54) CARBAZOLE-BASED POLYMER ELECTROLYTES AND METHODS OF MAKING THEREOF

(71) Applicant: Triad National Security, LLC, Los Alamos, NM (US)

(72) Inventors: Santosh Adhikari, Los Alamos, NM (US); Yu Seung Kim, Los Alamos, NM (US)

(73) Assignee: Triad National Security, LLC, Los Alamos, NM (US)

(*) Notice: Subject to any disclaimer, the term of this patent is extended or adjusted under 35 U.S.C. 154(b) by 774 days.

(21) Appl. No.: 18/172,510

(22) Filed: Feb. 22, 2023

(51) Int. Cl.

| | |
|---|---|
| ***H01M 8/103*** | (2016.01) |
| ***C08G 73/06*** | (2006.01) |
| ***C25B 1/04*** | (2021.01) |
| ***C25B 9/23*** | (2021.01) |
| ***C25B 13/08*** | (2006.01) |
| ***H01M 8/10*** | (2016.01) |
| ***H01M 8/1004*** | (2016.01) |

(52) U.S. Cl.
CPC ........ *H01M 8/103* (2013.01); *C08G 73/0672* (2013.01); *C25B 1/04* (2013.01); *C25B 9/23* (2021.01); *C25B 13/08* (2013.01); *H01M 8/1004* (2013.01); *H01M 2008/1095* (2013.01)

(58) Field of Classification Search
None
See application file for complete search history.

(56) References Cited

U.S. PATENT DOCUMENTS

2007/0178348 A1* 8/2007 Morishima ......... H01M 8/0618 521/25
2016/0244408 A1* 8/2016 Choo .................. C07D 403/06
(Continued)

FOREIGN PATENT DOCUMENTS

WO WO-2012011642 A1 * 1/2012 ............ H01B 1/122

OTHER PUBLICATIONS

Andrew R. Motz et al., "Performance and durability of anion exchange membrane water electrolyzers using down-selected polymer electrolytes," Journal of Materials Chemistry A, 9:22670-22683, (2021).
(Continued)

*Primary Examiner* — Maria V Ewald
*Assistant Examiner* — Suhani Jitendra Patel
(74) *Attorney, Agent, or Firm* — Alston & Bird LLP

(57) ABSTRACT

Provided are anion exchange membranes comprising a polymer having the structure

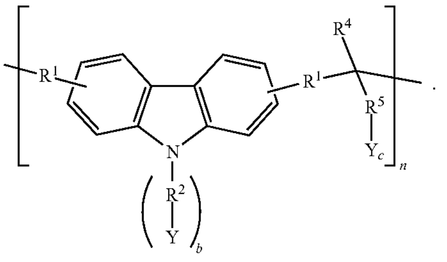

The anion exchange membranes are carbazole-based and aryl ether-free, with an ammonium group attached to the
(Continued)

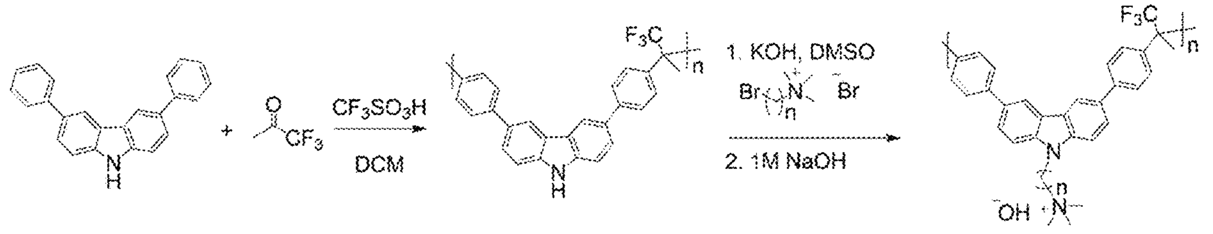

When n = 3, PDPC-3QA
n = 6, PDPC-6QA backbone. Methods of preparing such polymers, and fuel cells and water electrolyzers comprising such polymers, are also provided.

20 Claims, 25 Drawing Sheets

(56) References Cited

U.S. PATENT DOCUMENTS

2019/0270845 A1* 9/2019 Ullah ........................ C25B 1/04
2023/0105570 A1* 4/2023 Lee ........................... C25B 1/27
521/27

OTHER PUBLICATIONS

Andrit Allushi et al., "Ether-free polyfluorenes tethered with quinuclidinium cations as hydroxide exchange membranes," Journals of Material Chemistry A, 7:27164-27174, (2019).
Dong Pan et al., "Alkali-Stable Anion Exchange Membranes Based on Poly(xanthene)," ACS Macro Letters, 12:20-25, (2023).
Dongguo Li et al., "Impact of ionomer adsorption on alkaline hydrogen oxidation activity and fuel cell performance," Current Opinion in Electrochemistry, 12:189-195, (2018).
Eun Joo Park et al., "Alkaline Stability of Quaternized Diels-Alder Polyphenylenes," Macromolecules, 52:5419-5428, (2019).
Eun Joo Park et al., "Membrane Strategies for Water Electrolysis," ACS Energy Letters, 7:3447-3457, (2022).
Eun Joo Park et al., "Quaternized aryl ether-free polyaromatics for alkaline membrane fuel cells: synthesis, properties, and performance—a topical review," Journal of Materials Chemistry A, 6:15456-15477, (2018).
G. Kresse et al., "Ab initio molecular dynamics for liquid metals," Physical Review B, 47(1):558-561, (Jan. 1, 1993).
Guillermo Román-Pérez et al., "Efficient Implementation of a van der Waals Density Functional: Application to Double-Wall Carbon Nanotubes," Physical Review Letters, 103(096102):1-4, (Aug. 28, 2009).
Hai-Son Dang et al., "Alkali-stable and highly anion conducting poly(phenylene oxide)s carrying quaternary piperidinium cations," Journal of Materials Chemistry A, 4:11924-11938, (2016).
Hamish Andrew Miller et al., "Green hydrogen from anion exchange membrane water electrolysis: a review of recent developments in critical materials and operating conditions," Sustainable Energy Fuels, 4:2114-2133, (2020).
Hendrik J. Monkhorst et al., "Special points for Brillouin-zone integrations," Physical Review B, 13(12):5188-5192, (Jun. 15, 1976).
Ivana Matanovic et al., "Adsorption of Polyaromatic Backbone Impacts the Performance of Anion Exchange Membrane Fuel Cells," Chemistry of Materials, 31:4195-4204, (2019).
Ivana Matanovic et al., "Benzene Adsorption: A Significant Inhibitor for the Hydrogen Oxidation Reaction in Alkaline Conditions," The Journal of Physical Chemistry Letters, 8:4918-4924, (2017).
Jing Pan et al., "Cationic Side-Chain Attachment to Poly(Phenylene Oxide) Backbones for Chemically Stable and Conductive Anion Exchange Membranes," Chemistry of Materials, 29:5321-5330, (2017).
Jiří Klimeš et al., "Van der Waals density functionals applied to solids," Physical Review B, 83(195131):1-13, (2011).
John R. Varcoe et al., "Anion-exchange membranes in electrochemical energy systems," Energy & Environmental Science, 7(10):3135-3191, (2014).
Jong Yeob Jeon et al., "Synthesis of Aromatic Anion Exchange Membranes by Friedel-Crafts Bromoalkylation and Cross-Linking of Polystyrene Block Copolymers," Macromolecules, 52:2139-2147, (2019).
Junhua Wang et al., "Poly(aryl piperidinium) membranes and ionomers for hydroxide exchange membrane fuel cells," Nature Energy, 4:392-398, (May 2019).
Junmin Li et al., "Novel poly(carbazole-butanedione) anion exchange membranes constructed by obvious microphase separation for fuel cells," International Journal of Hydrogen Energy, 47:32262-32272, (2022).
Kuan Yang et al., "Preparation and properties of anion exchange membranes with exceptional alkaline stable polymer backbone and cation groups," Journal of Membrane Science, 596:1-8, (2020).
Liang Zhu et al., "Poly(olefin)-Based Anion Exchange Membranes Prepared Using Ziegler-Natta Polymerization," Macromolecules, 52:4030-4041, (2019).
M. Methfessel et al., "High-precision sampling for Brillouin-zone integration in metals," Physical Review B, 40(6):3616-3621, (Aug. 15, 1989).
Maurizio Cossi et al., "Ab initio study of solvated molecules: a new implementation of the polarizable continuum model," Chemical Physics Letters, 255:327-335, (1996).
Melinda L. Einsla et al., "Toward improved conductivity of sulfonated aromatic proton exchange membranes at low relative humidity," Chemistry of Materials, 20(17):5636-5642, (2008).
Michael K. Pagels et al., "One-Pot Synthesis of Proton Exchange Membranes from Anion Exchange Membrane Precursors," ACS Macro Letters, 9:1489-1493, (2020).
Michelle Lehmann et al., "Quaternized Polynorbornene Random Copolymers for Fuel Cell Devices," ACS Applied Energy Materials, 10.1021/acsaem.1022c03682, 6:1822-1833, (2023).
Min Hu et al., "Comb-shaped anion exchange membrane with densely grafted short chains or loosely grafted long chains?," Journal of Membrane Science, 585:150-156, (2019).
Min Suc Cha et al., "Poly(carbazole)-based anion-conducting materials with high performance and durability for energy conversion devices," Energy & Environmental Science, 13:3633-3645, (2020).
Nanjun Chen et al., "Anion exchange polyelectrolytes for membranes and ionomers," Progress in Polymer Science, 113:1-35, (2021).
Nanjun Chen et al., "Poly(fluorenyl aryl piperidinium) membranes and ionomers for anion exchange membrane fuel cells," Nature Communications, 12:1-12, (2021).
P. E. Blöchl, "Projector Augmented-Wave Method," Physical Review B, 50(24):17 953-17 979, (Dec. 15, 1994).
S. Miertuš et al., "Electrostatic Interaction of a Solute with a Continuum. A Direct Utilization of ab initio Molecular Potentials for the Prevision of Solvent Effects," Chemical Physics, 55:117-129, (1981).
Sandip Maurya et al., "Toward Improved Alkaline Membrane Fuel Cell Performance Using Quaternized Aryl-Ether Free Polyaromatics," Chemistry of Materials, 30:2188-2192, (2018).
Sandip Maurya et al., "Rational design of polyaromatic ionomers for alkaline membrane fuel cells with > 1 W cm(-2) power density," Energy & Environmental Science, 11:3283-3291, (2018).
Sangtaik Noh et al., "Molecular Engineering of Hydroxide Conducting Polymers for Anion Exchange Membranes in Electrochemical Energy Conversion Technology," Accounts of Chemical Research, 52:2745-2755, (2019).
Santosh Adhikari et al., "Hydrophobic Quaternized Poly(fluorene) Ionomers for Emerging Fuel Cells," ACS Applied Energy Materials, 5:2663-2668, (2022).
Shimshon Gottesfeld et al., "Anion exchange membrane fuel cells: Current status and remaining challenges," Journal of Power Sources, 375:170-184, (2018).
Shoji Miyanishi et al., "Highly conductive mechanically robust high Mw polyfluorene anion exchange membrane for alka-line fuel cell and water electrolysis application," Polymer Chemistry, 11:3812-3820, (2020).
Thanh Huong Pham et al., "Rational molecular design of anion exchange membranes functionalized with alicyclic quaternary ammonium cations," Polymer Chemistry, 11:6953-6963, (2020).
Wei Yuan et al., "High performance poly(carbazolyl aryl piperidinium) anion exchange membranes for alkaline fuel cells," Journal of Membrane Science, 657:1-9, (2022).

(56) References Cited

OTHER PUBLICATIONS

Woo-Hyung Lee et al., "Poly(terphenylene) Anion Exchange Membranes: The Effect of Backbone Structure on Morphology and Membrane Property," ACS Macro Letters, 6:566-570, (2017).
Woo-Hyung Lee et al., "Robust Hydroxide Ion Conducting Poly(biphenyl alkylene)s for Alkaline Fuel Cell Membranes," ACS Macro Letters, 4:814-818, (2015).
Xiaomeng Chu et al., "Crucial role of side-chain functionality in anion exchange membranes: Properties and alkaline fuel cell performance," Journal of Membrane Science, 625:1-12, (2021).
Xinming Du et al., "Synthesizing spindle-shaped anion exchange membranes to improve conductivity and stability," International Journal of Hydrogen Energy, 45:11814-11823, (2020).
Xixing Zhou et al., "Rational design of comb-shaped poly(arylene indole piperidinium) to enhance hydroxide ion transport for H2/O2 fuel cell," Journal of Membrane Science, 631:1-12, (2021).
Xu Hu et al., "Piperidinium functionalized aryl ether-free polyaromatics as anion exchange membrane for water electrolysers: Performance and durability," Journal of Membrane Science, 621:1-12, (2021).

* cited by examiner

CARBAZOLE-BASED POLYMER ELECTROLYTES AND METHODS OF MAKING THEREOF

STATEMENT REGARDING FEDERAL RIGHTS

This work was supported by the U.S. Department of Energy (US DOE), Office of Energy Efficiency and renewable Energy (EERE), Hydrogen and Fuel Cell technologies Office (HFTO) under contract no. DE-AC52-06NA25396. This work was partially supported by the US DOE ARPA-E (award number: DE-AR0001003). The computational resources of LANL institutional Computing Program, which is supported by the US DOE National Nuclear Security Administration under contract 89233218CNA000001 and NERSC, a DOE Office of Science User Facility supported by the Office of Science of the US DOE under contract DE-AC02-05CH11231, were also used. LANL is operated by Triad National Security, LLC for the National Nuclear Security Administration under contract 89233218CNA000001. The government has certain rights in the invention.

FIELD

The present invention relates generally to anion exchange membranes for use in fuel cells and water electrolyzers.

BACKGROUND

To combat climate change, global demand for clean and sustainable energy is increasing. Energy conversion and production devices such as fuel cells and electrolyzers play a vital role in achieving this goal Though proton exchange membrane fuel cells and electrolyzers are commercially available, the requirements of expensive platinum group metal electrocatalysts and bipolar plates have become a major barrier impeding their broad market penetration Anion exchange membrane (AEM)-based electrochemical devices at high pH offer benefits in implementing non-platinum group metal catalysts and less expensive bipolar plates.

In the past decade, extensive research has been conducted in preparing AEMs with high conductivity, alkaline stability, and good mechanical properties as these parameters of membrane determine the performance and durability of the devices. Though significant progress has been made in developing such AEMs, there are only a few of them that have shown promising performance. Most of these promising AEMs are aryl ether-free polyaromatic backbone polymers with alkaline stable cation functional groups. One of the drawbacks of these polyaromatic AEMs is that phenyl groups in the polymers can adsorb on the catalyst surface and negatively impact the device performance.

Accordingly, there still exists a need for improved AEMs for use in fuel cells and water electrolyzers. It is with this need in mind that the present invention was developed.

BRIEF SUMMARY OF INVENTION

An embodiment of the invention is a polymer having the structure:

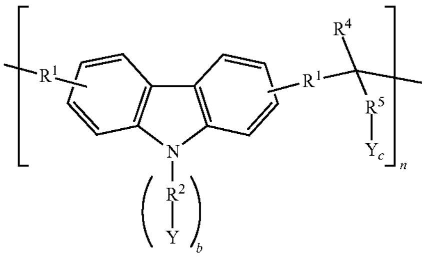

wherein each $R^1$ is independently a $C_6$-$C_{14}$ aryl;

$R^2$ is a $C_3$-$C_{24}$ alkyl;

$R^4$ is an unsubstituted, fluorinated, or perfluorinated $C_1$-$C_6$ alkyl;

$R^5$ is an unsubstituted, fluorinated, or perfluorinated $C_1$-$C_6$ alkyl;

Y is

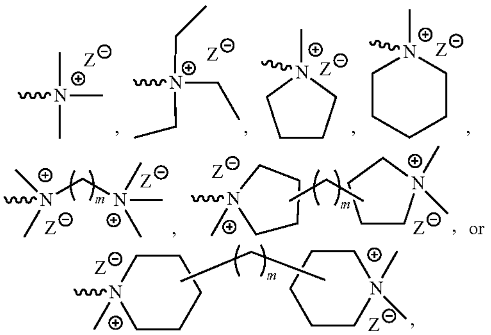

wherein Z is a counter ion,  represents the point of attachment to the remainder of the polymer, and m is 4-12;

n is 2 to 10,000;

b is 0 or 1;

c is 0 or 1; and b+c=1 or 2.

Another embodiment is an anion exchange membrane comprising a polymer as described above.

Another embodiment is a fuel cell or water electrolyzer, comprising an anion exchange membrane as described above.

Another embodiment is a method of preparing a polymer as described above, said method comprising i) reacting a compound having the structure

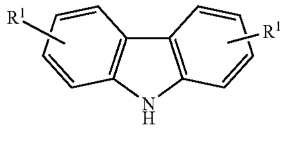

with a compound having the structure

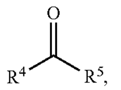

so as to form a polymer having the structure

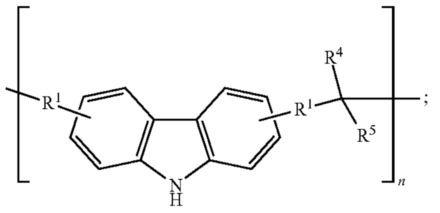

ii) reacting the polymer formed in step i) with a compound having the structure $X—R^2—Y''$, wherein Y" is

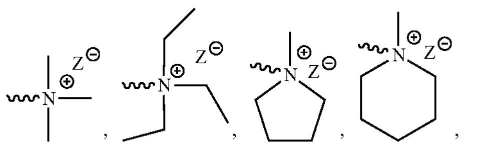

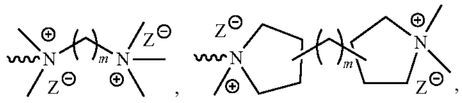

or

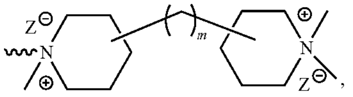

and m is 4-12, so as to form a polymer; and iii) reacting the polymer formed in step ii) with a base or salt comprising a counter ion Z, so as to form the polymer having the structure

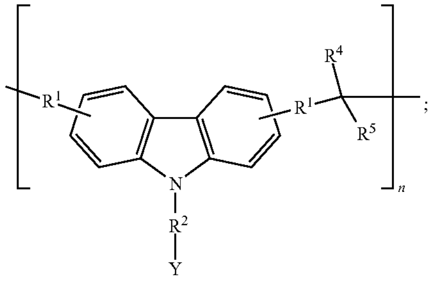

wherein X is a halogen.

Another embodiment is a method of preparing a polymer as described above, said method comprising:

i) reacting a compound having the structure

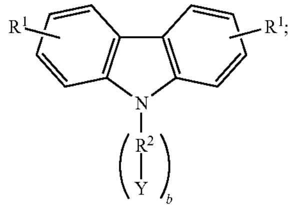

with a compound having the formula

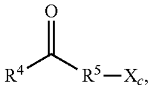

so as to form a polymer having the structure

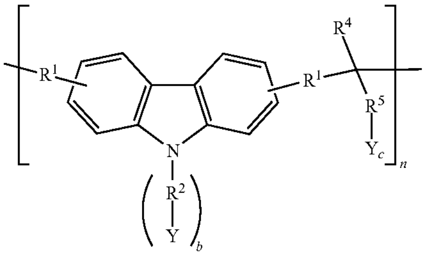

wherein each X is independently a halogen;

ii) reacting the polymer formed in step i) with Y', where Y' is

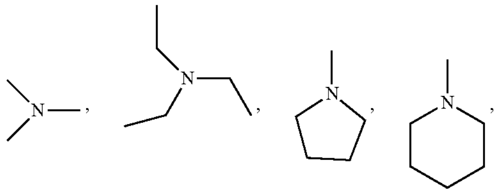

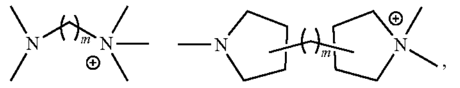

or

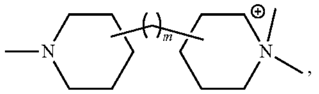

and m is 4-12, so as to form a polymer; and iii) reacting the polymer formed in step ii) with a base or salt comprising a counter ion Z, so as to form the polymer having the structure

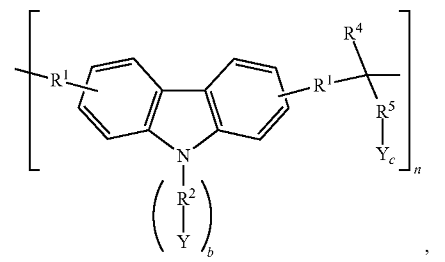

wherein b is 0 or 1;
c is 0 or 1; and
b+c=1 or 2.

BRIEF DESCRIPTION OF THE SEVERAL VIEWS OF THE DRAWINGS

Figure 1:
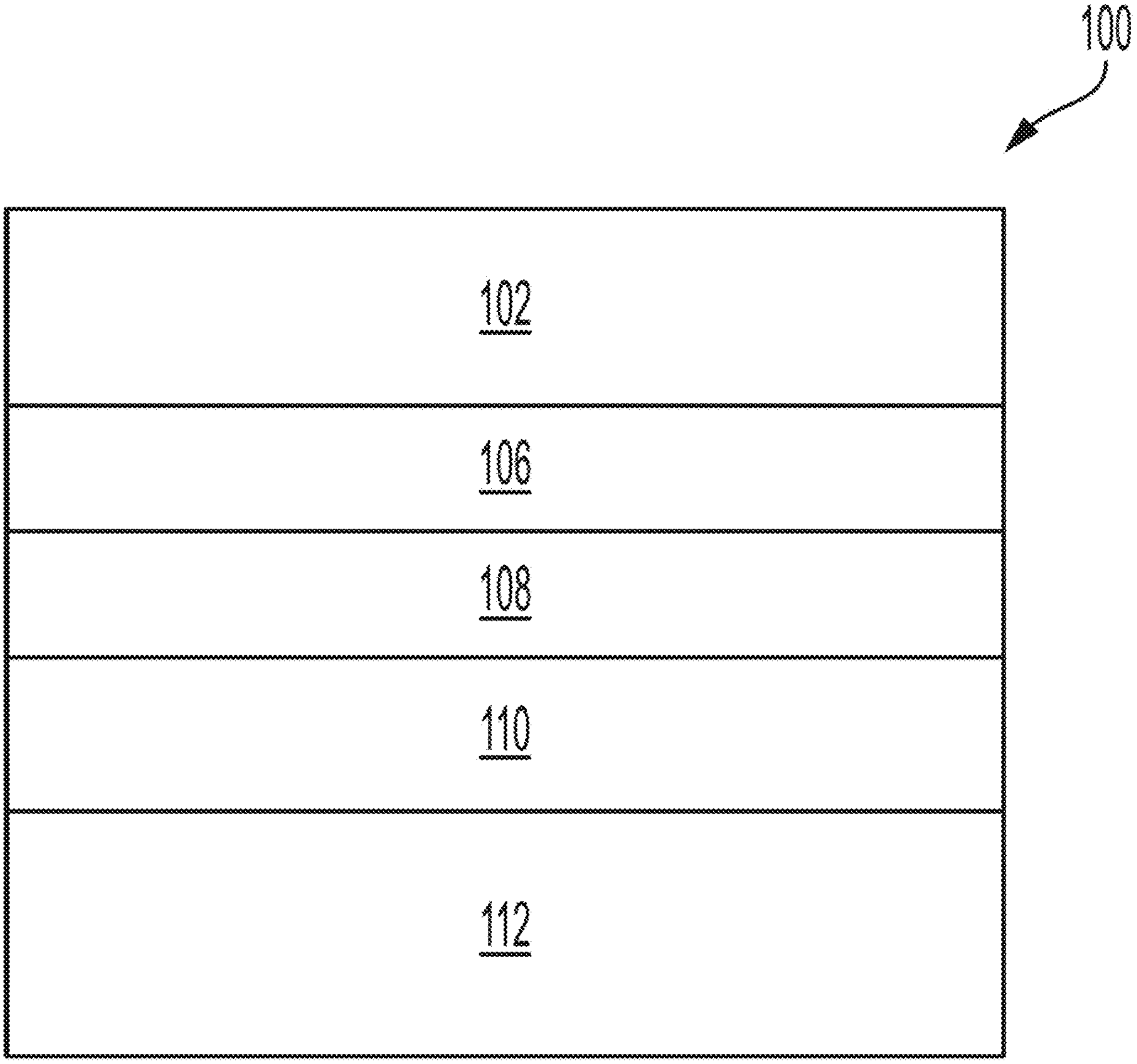

Having thus described the invention in general terms, reference will now be made to the accompanying drawings, which are not necessarily drawn to scale, and wherein:

FIG. 1 shows a schematic of a fuel cell or water electrolyzer comprising an anion exchange membrane.

Figure 2A:
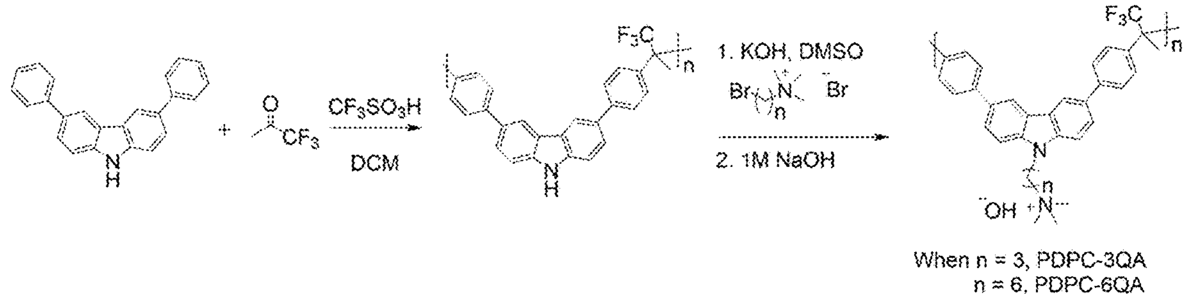
Figure 2B:
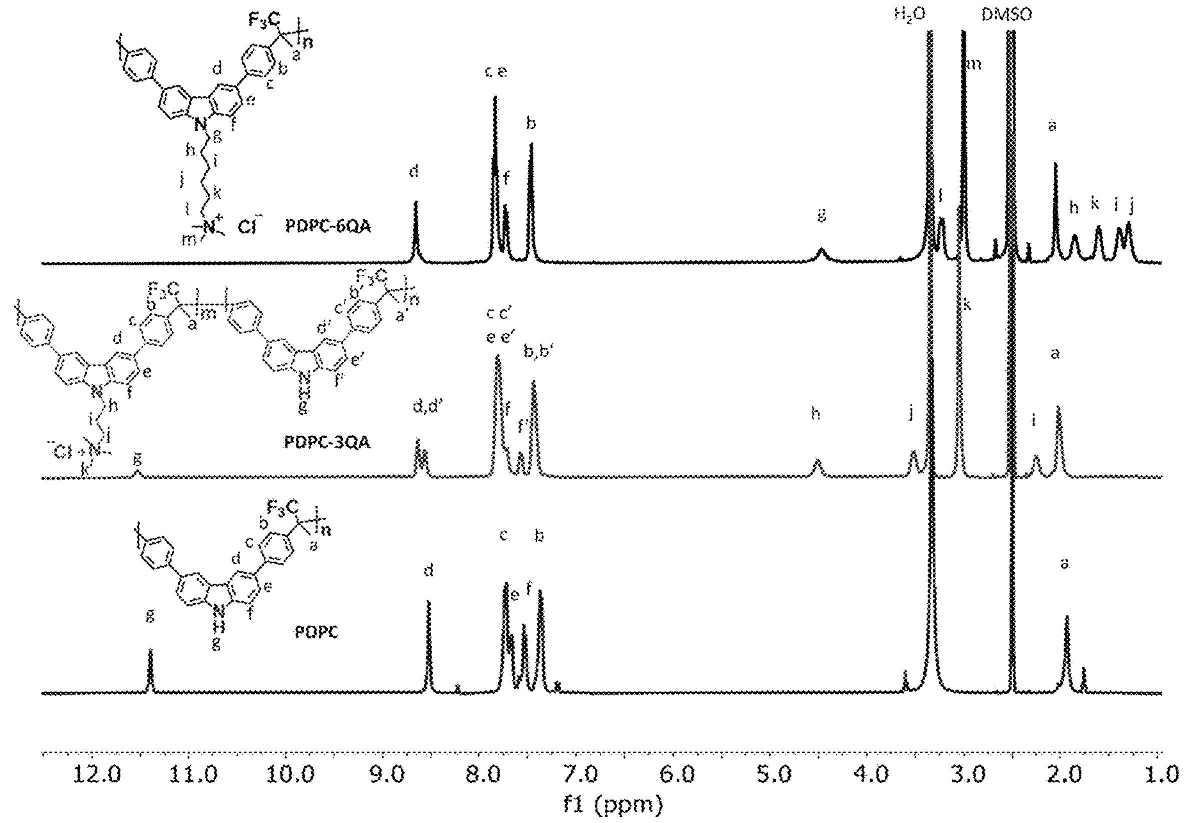
Figure 2C:
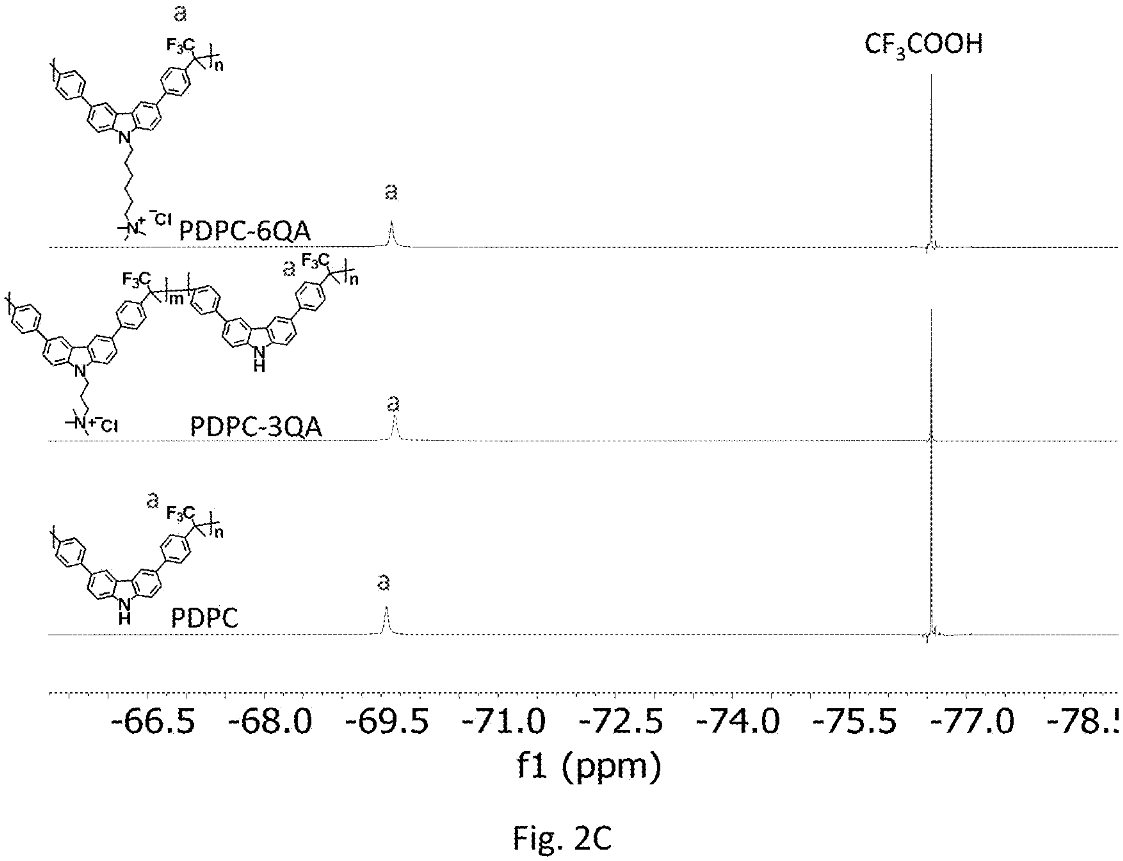

FIG. 2A shows a synthetic scheme for PDPC-nQA. FIG. 2B shows $^{1}H$ NMR data for PDPC, PDPC-3QA, and PDPC-6QA in DMSO-d6. FIG. 2C shows $^{19}F$ NMR data for PDPC, PDPC-3QA, and PDPC-6QA in DMSO-d6 with standard $CF_3COOH$.

Figure 3A:
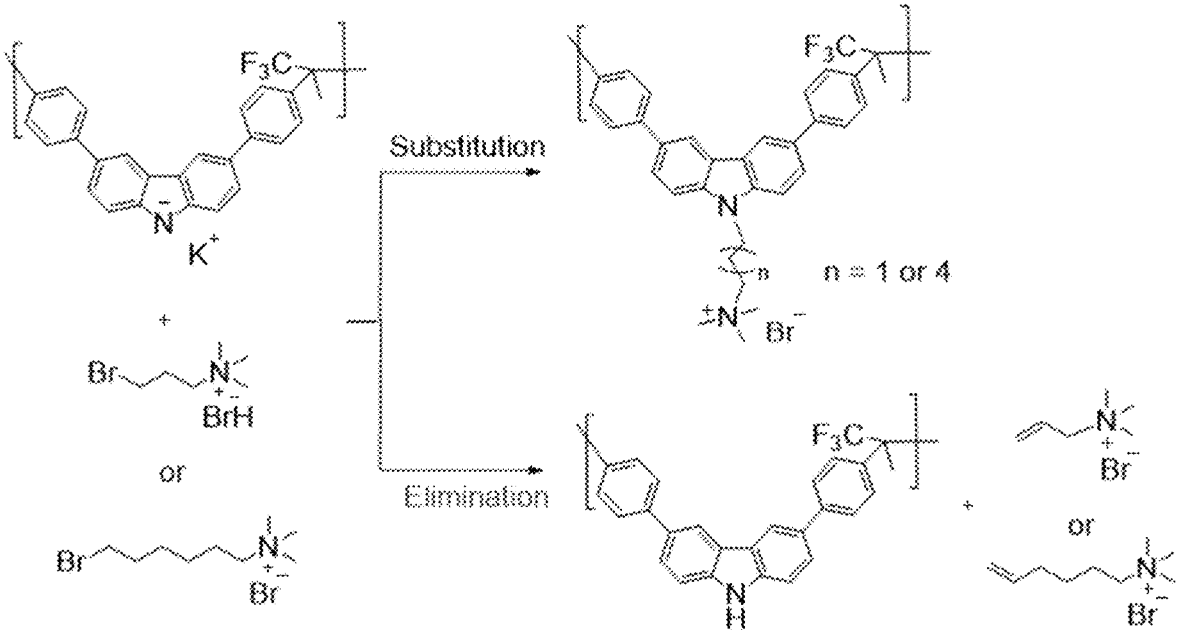
Figure 3B:
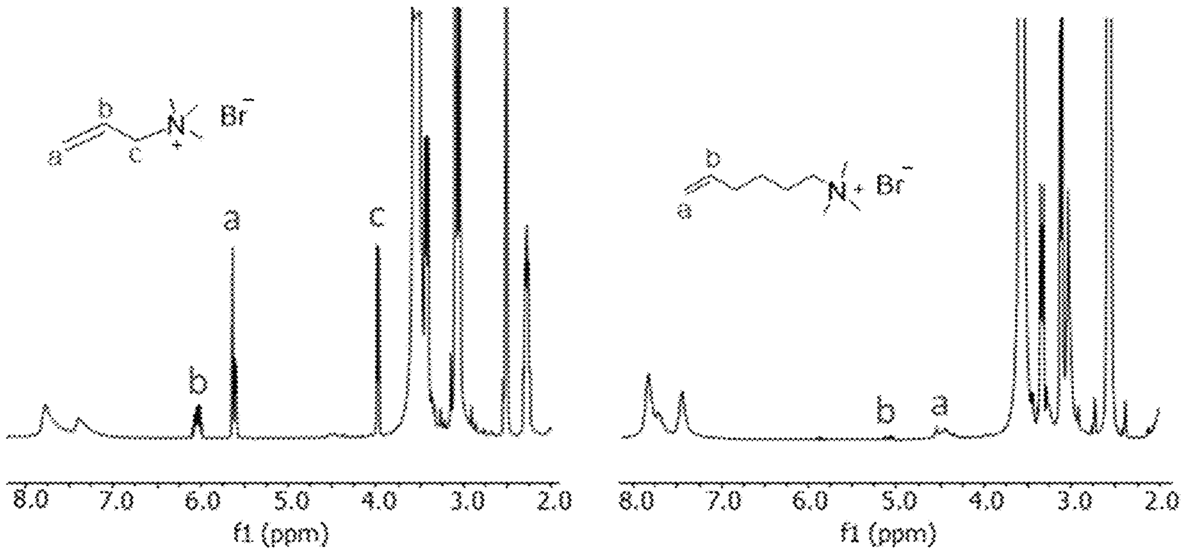
Figure 3C:
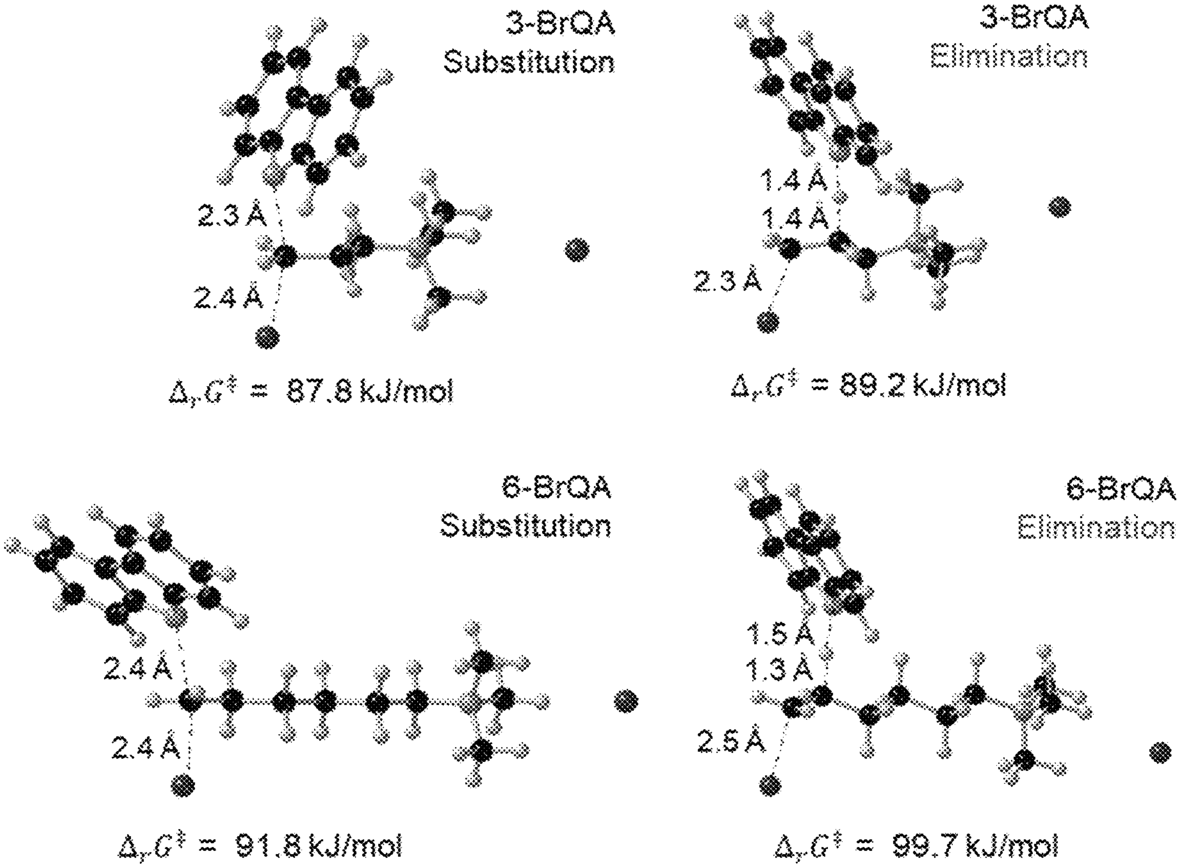

FIG. 3A shows a reaction scheme showing the products resulting from the substitution and elimination reaction on 3-BrQA and 6BrQA during grafting on PDPC. FIG. 3B shows $^{1}H$ NMR spectra of the reaction mixture during the grafting of the precursor polymer, PDPC with 3-BrQA (left) and 6-BrQA (right) in DMSO-d6. FIG. 3C shows transition state geometry and energy barrier for substitution and elimination reaction in 3-BrQA and 6-BrQA as calculated using b3lyp/6-311++G(2d,2p) level of theory.

Figure 4:
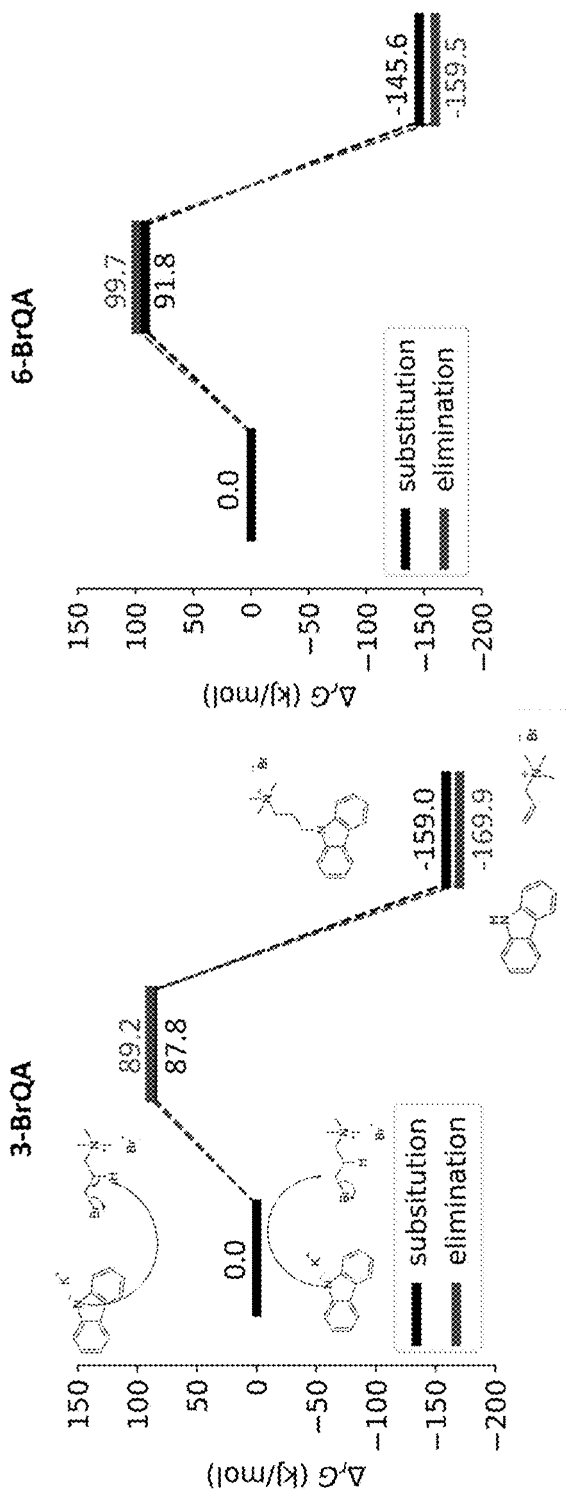

FIG. 4 shows barrier energy data for the E2 and $S_N2$ reactions for adding ammonium-containing groups to carbazole.

Figure 5:
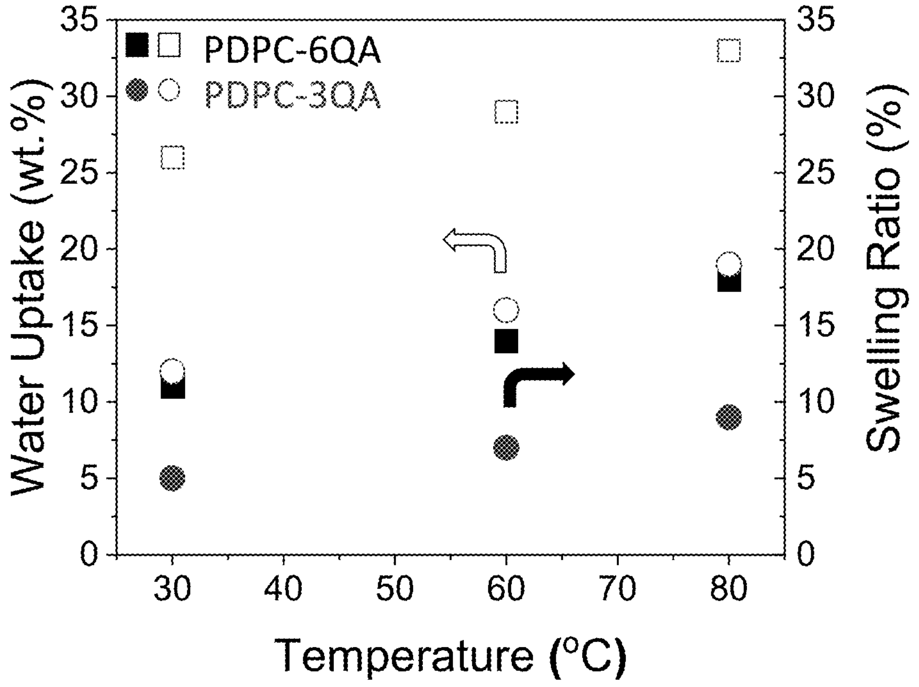

FIG. 5 shows water uptake and swelling ratio data for PDPC-6QA and PDPC-3QA.

Figure 6:
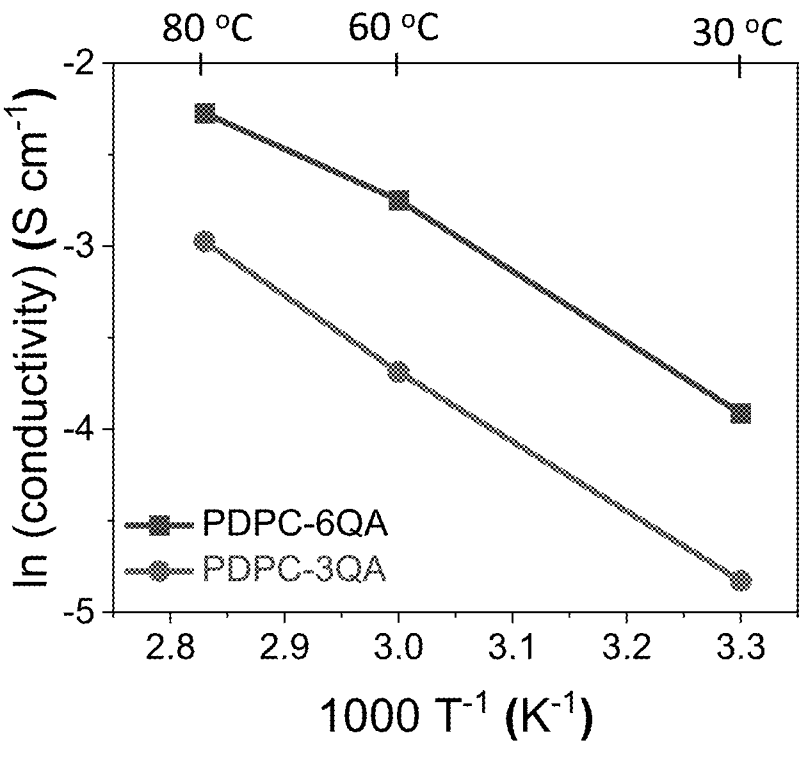

FIG. 6 shows hydroxide conductivity data for PDPC-6QA and PDPC-3QA.

Figure 7A:
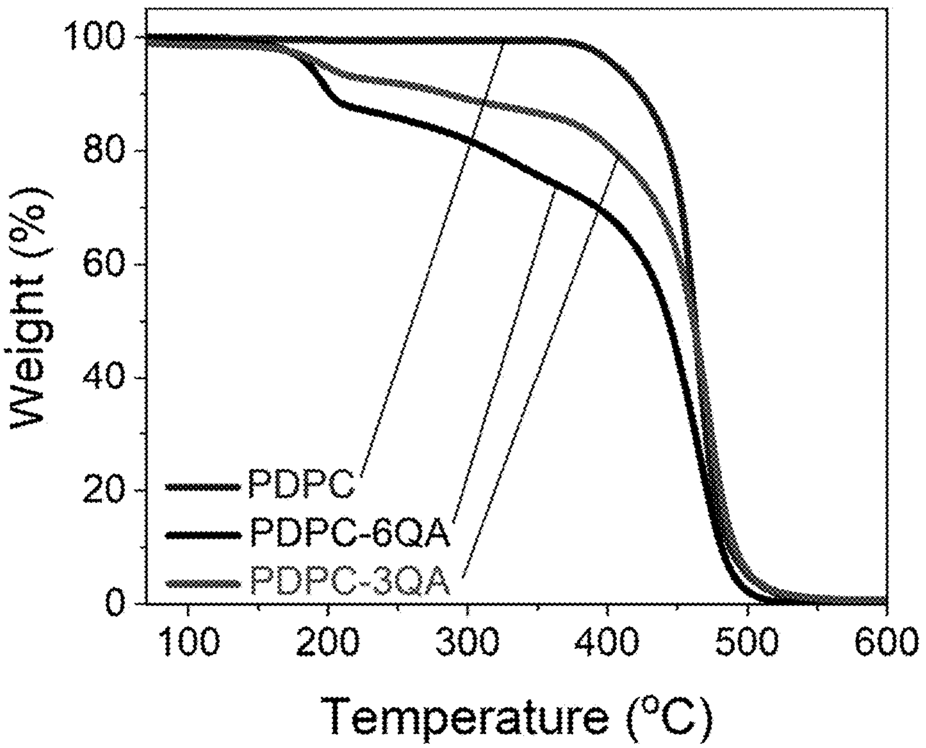
Figure 7B:
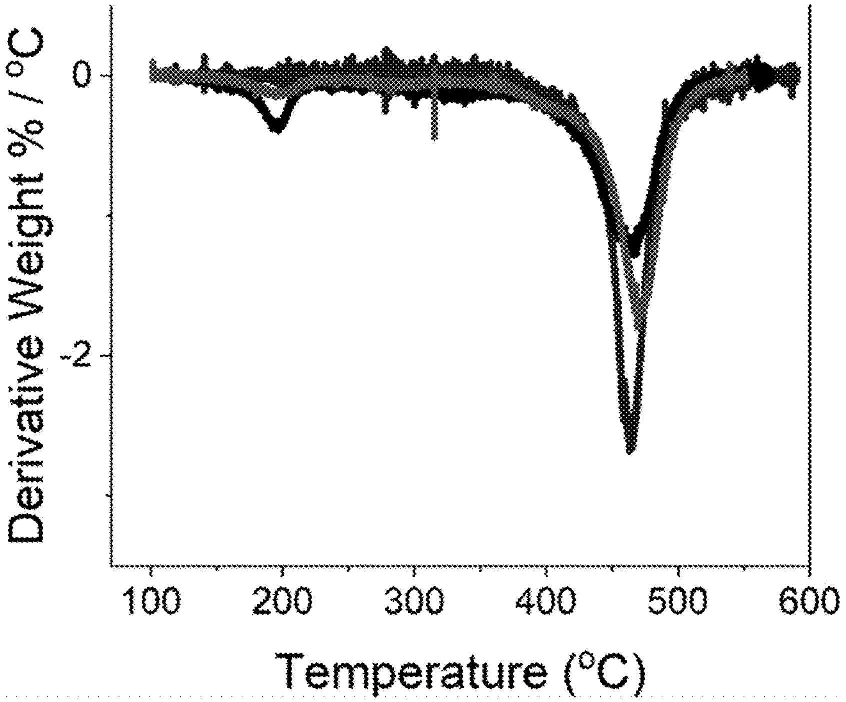

FIGS. 7A and 7B show TGA curves, and the corresponding first derivatives, for PDPC-6QA and PDPC-3QA.

Figure 8:
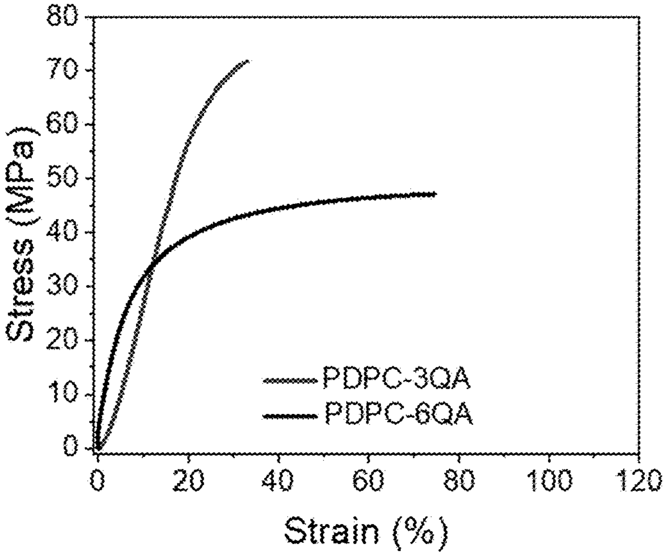

FIG. 8 shows tensile stress/strain data for PDPC-6QA and PDPC-3QA.

Figure 9:
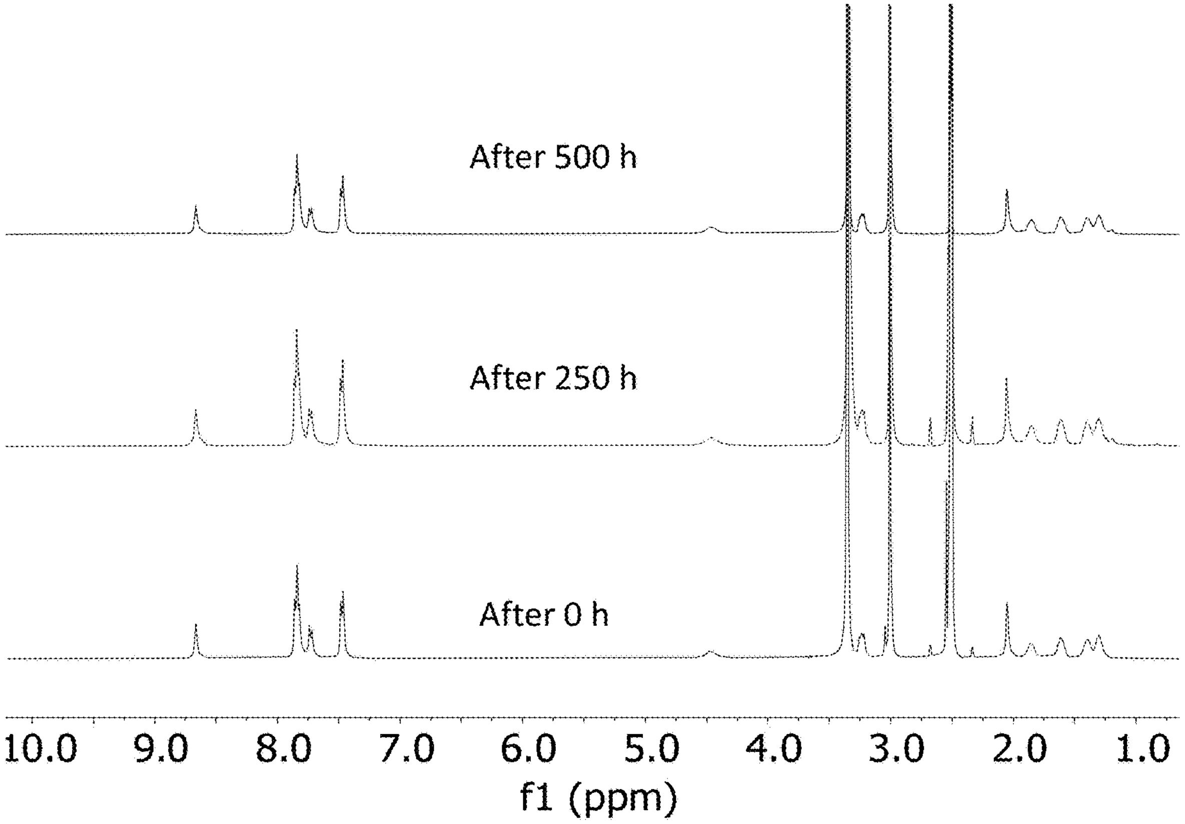

FIG. 9 shows $^{1}H$ NMR spectra from an alkaline stability test of PDPC-6QA after 0 h, 250 h, and 500 h under 1 M NaOH and 80° C. measured in DMSO-d6.

Figure 10A:
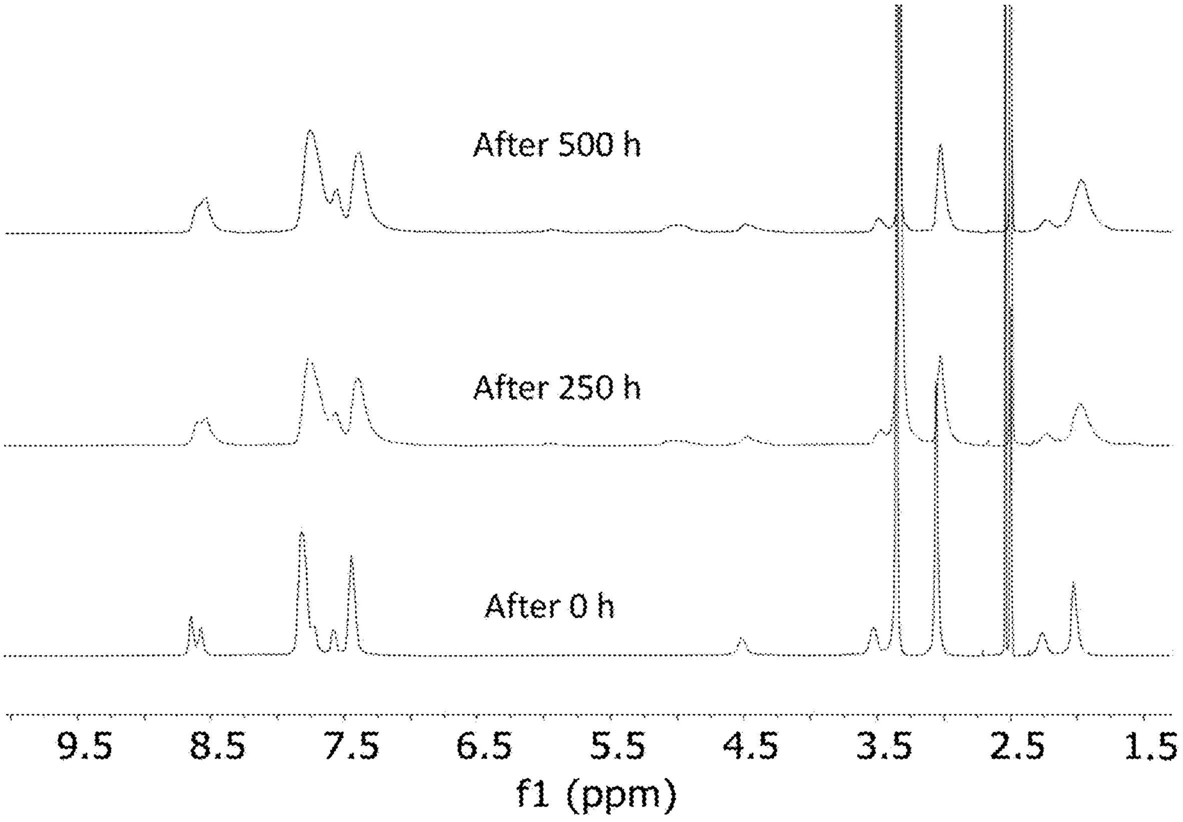
Figure 10B:
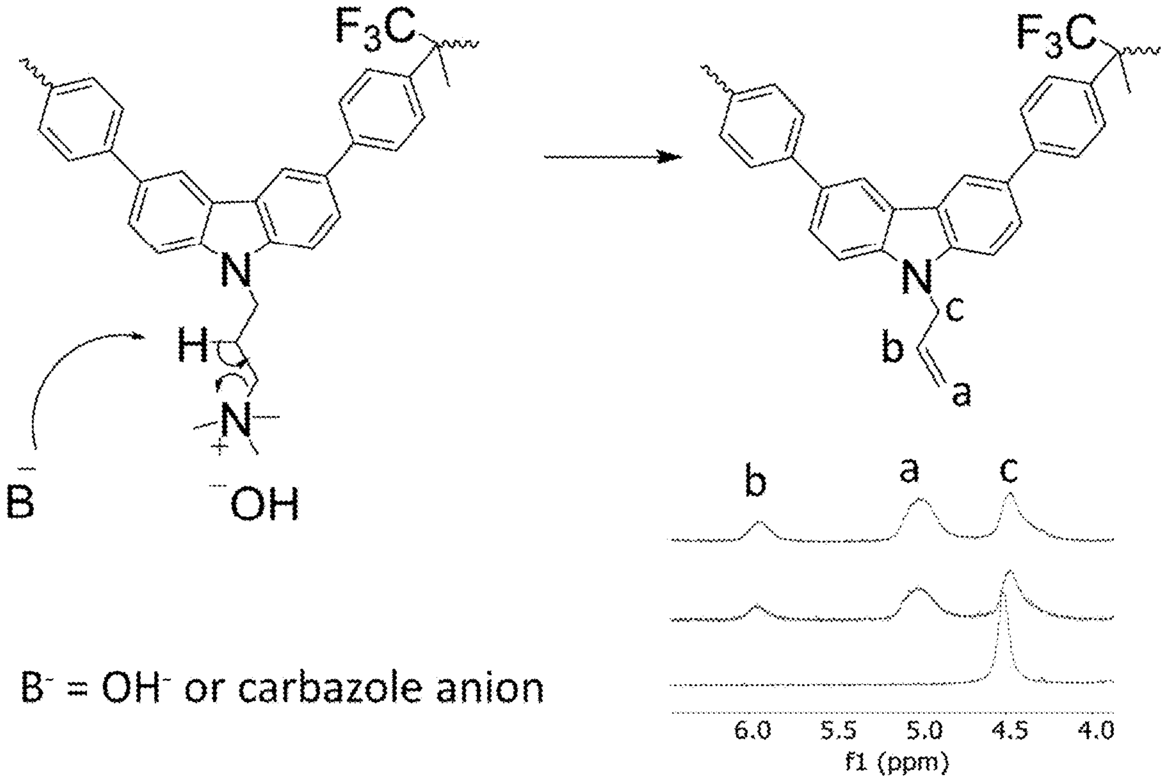

FIG. 10A shows $^{1}H$ NMR spectra from an alkaline stability test of PDPC-3QA after 0 h, 250 h, and 500 h under 1 M NaOH and 80° C. measured in DMSO-d6. FIG. 10B shows a degradation mechanism of PDPC-3QA under alkaline stability test conditions.

Figure 11A:
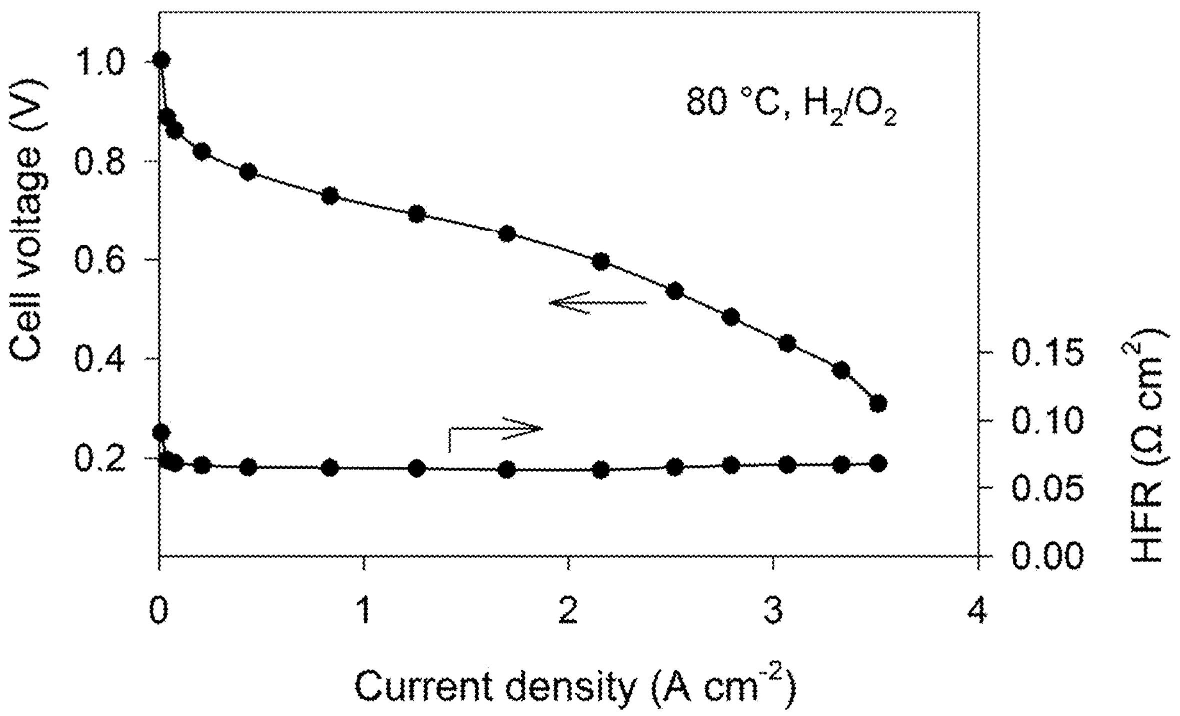
Figure 11B:
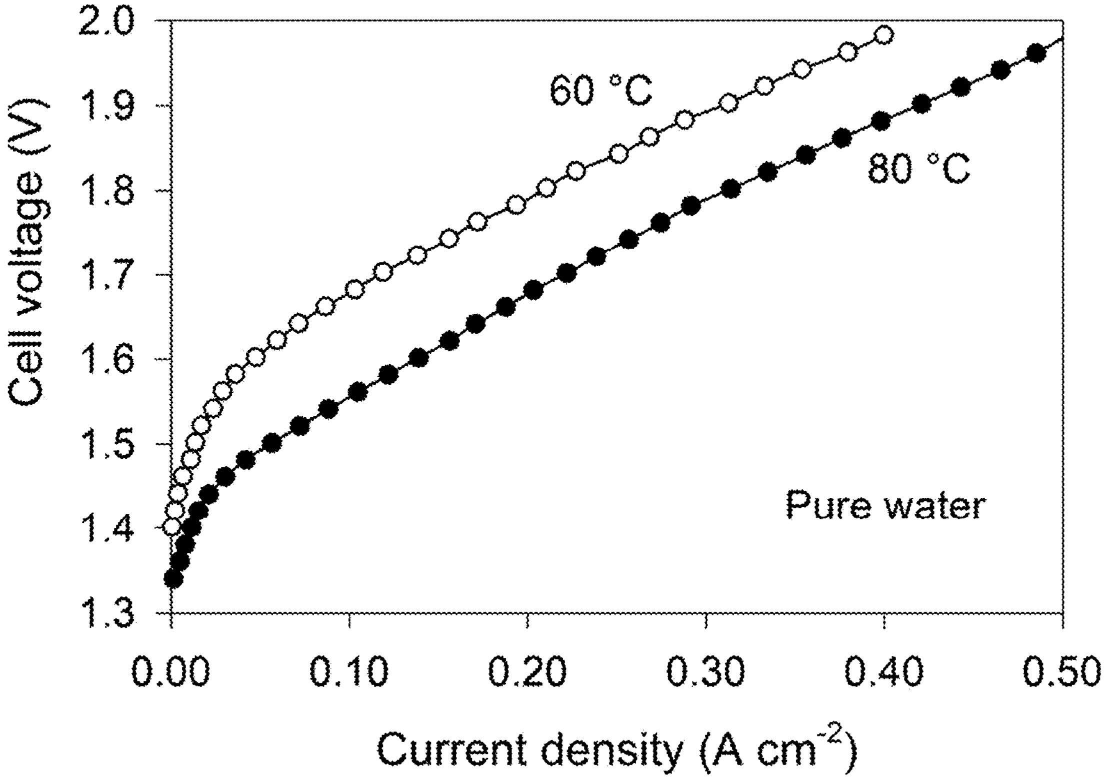

FIG. 11A shows a polarization curve and HFR of the AEMFC using the PDPC-6QA AEM. Anode catalyst: PtRu (Pt:Ru=1:1, 0.5 $mg_{Pt}$ $cm^{-2}$. Cathode catalyst: Pt/C (0.6 $mg_{Pt}$ $cm^{-2}$). Ionomeric binder: quaternized polynorbornene. Performance was measured with 148 kPa backpressure and 100% RH. FIG. 11B shows polarization curves of the AEMWE using the PDPC-6QA AEM. Anode catalyst: $IrO_2$, (2.3 $mg_{Pt}$ $cm^{-2}$). Cathode catalyst: Pt (1.8 $mg_{Pt}$ $cm^{-2}$). Pure water was fed to the anode (10 mL/min). Ionomeric binder: quaternized polynorbornene.

Figure 12A:
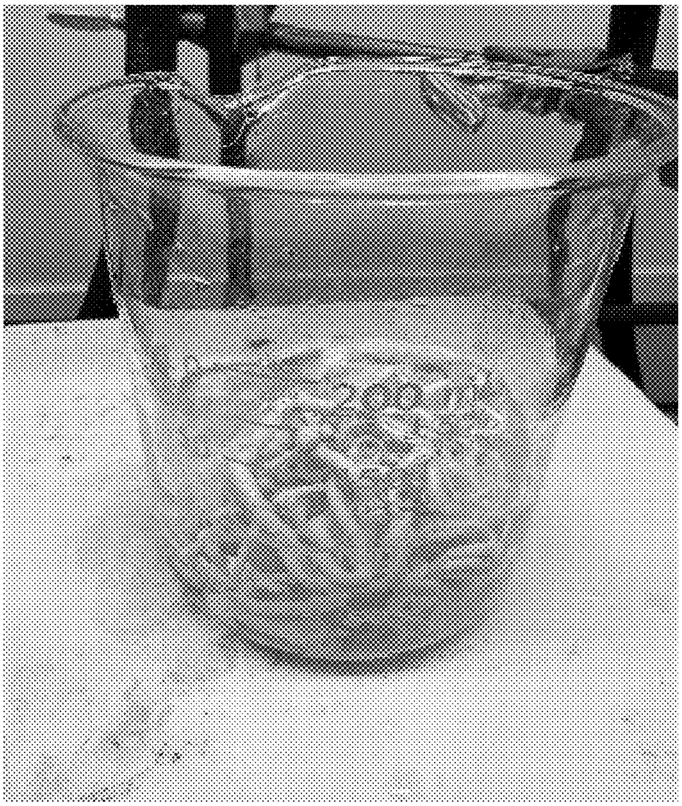
Figure 12B:
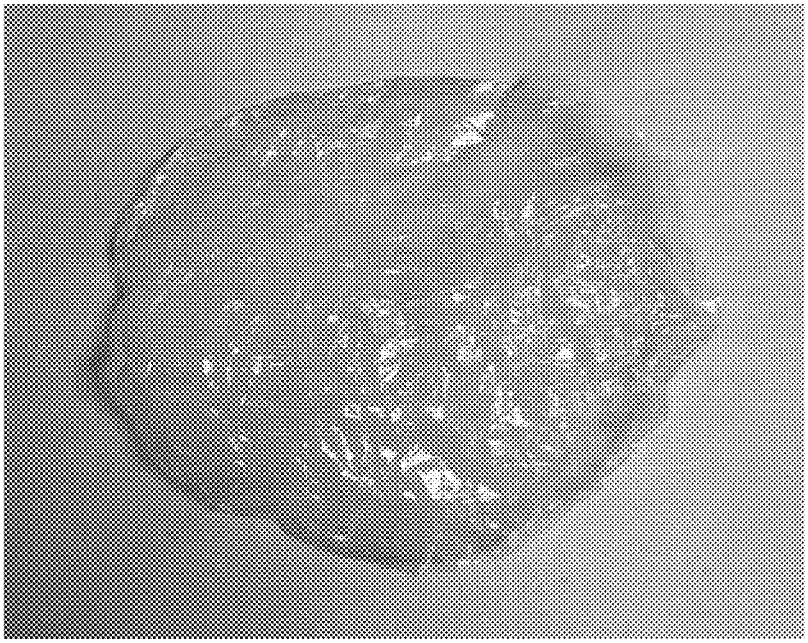

FIG. 12A is a photograph of a PDPC polymer as prepared according to the description below. FIG. 12B is a photograph of a PDPC-6QA polymer as prepared according to the description below, in the form of a film.

Figure 13A:
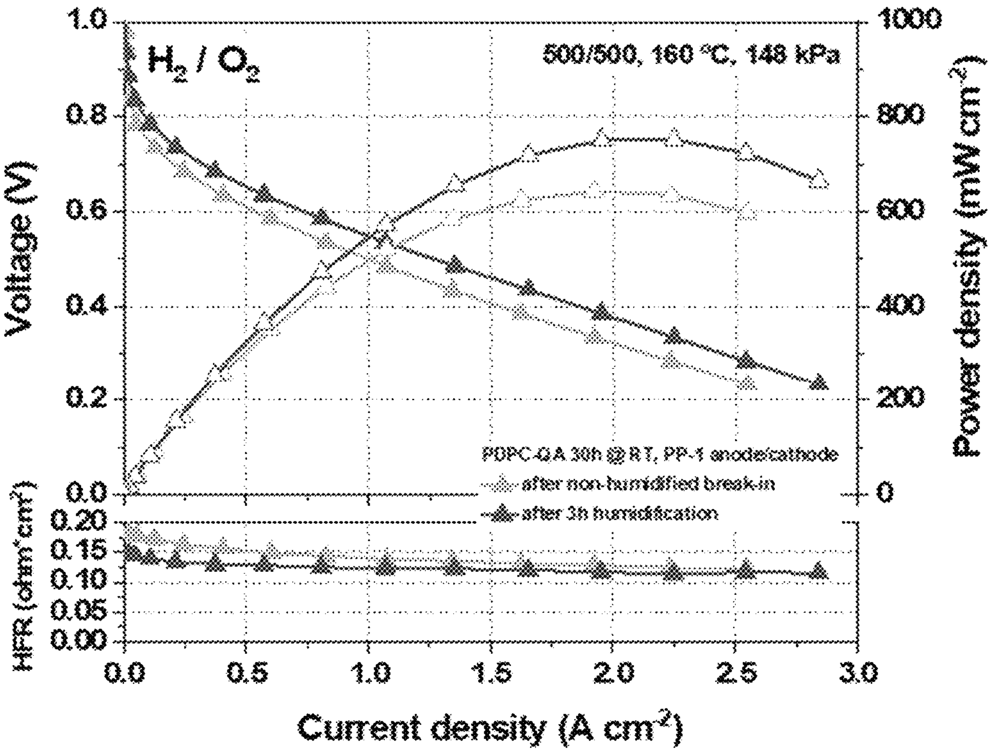
Figure 13B:
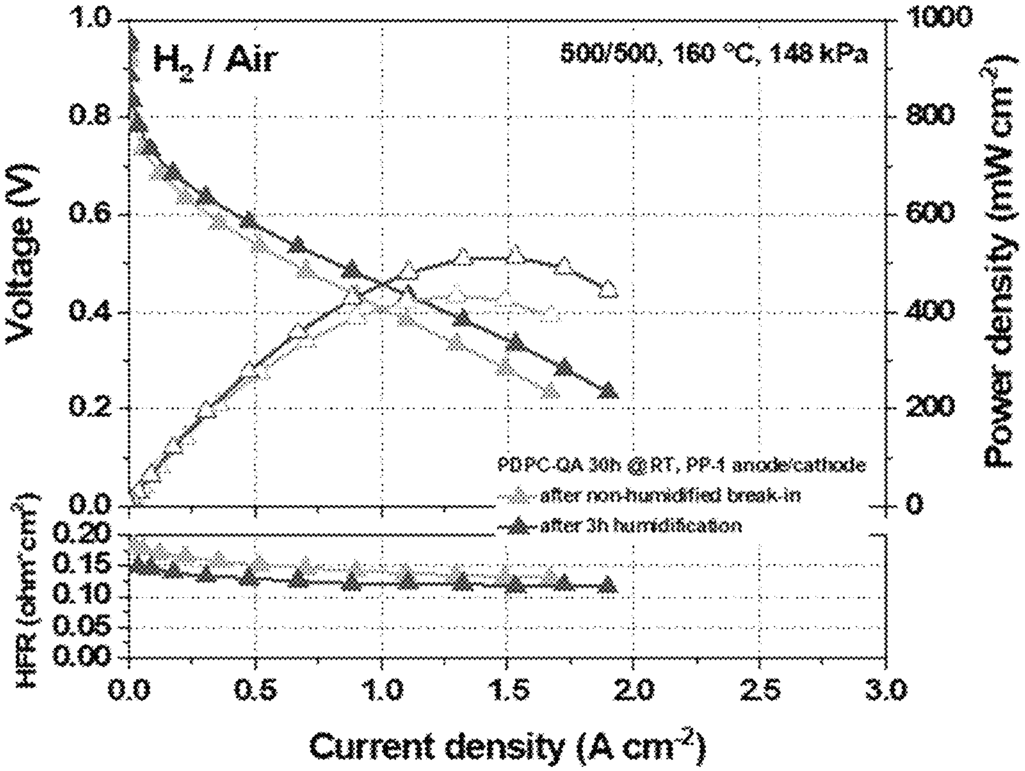
Figure 13C:
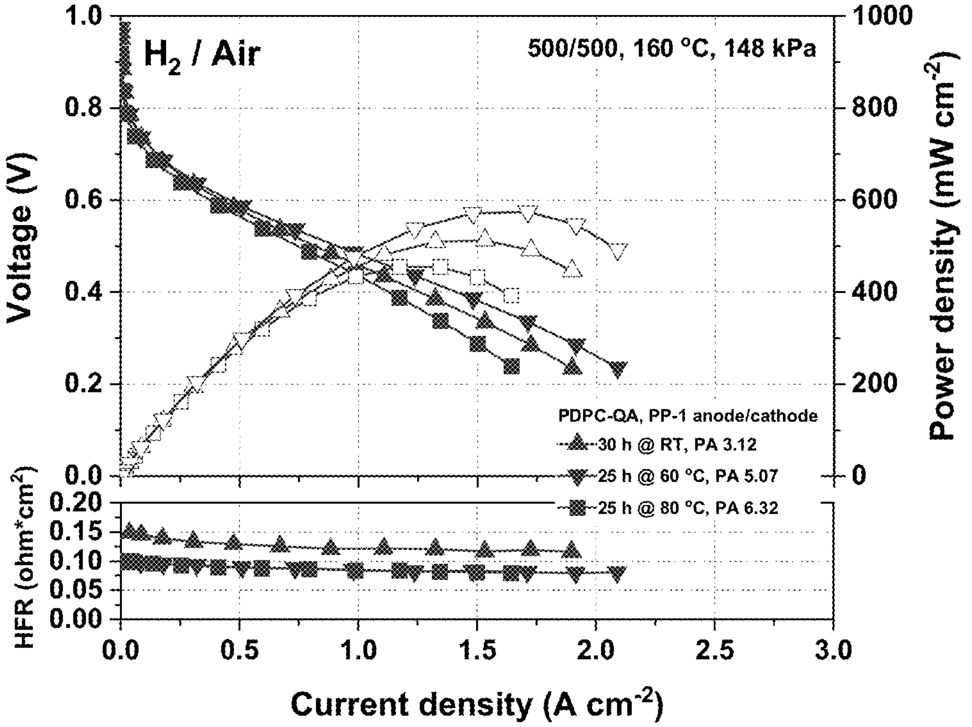

FIGS. 13A-13B show data from phosphoric acid-doped PDPC-6QA polymer used in a proton exchange membrane in a high-temperature fuel cell, in $H_2/O_2$ and $H_2$/air conditions, respectively. FIG. 13C shows comparitive data for different phosphoric acid doping processes.

Figure 14:
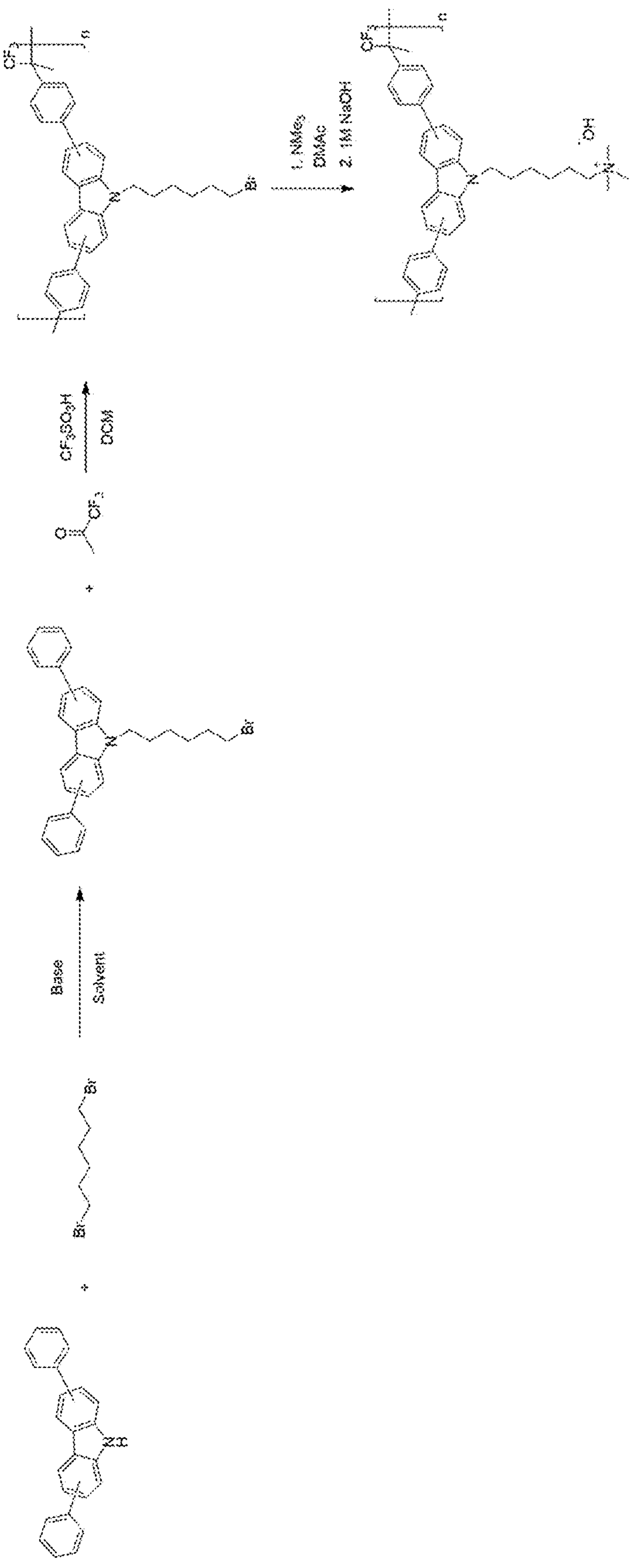

FIG. 14 depicts an alternate synthetic route for the PDPC-QA polymers of the invention.

Figure 15A:
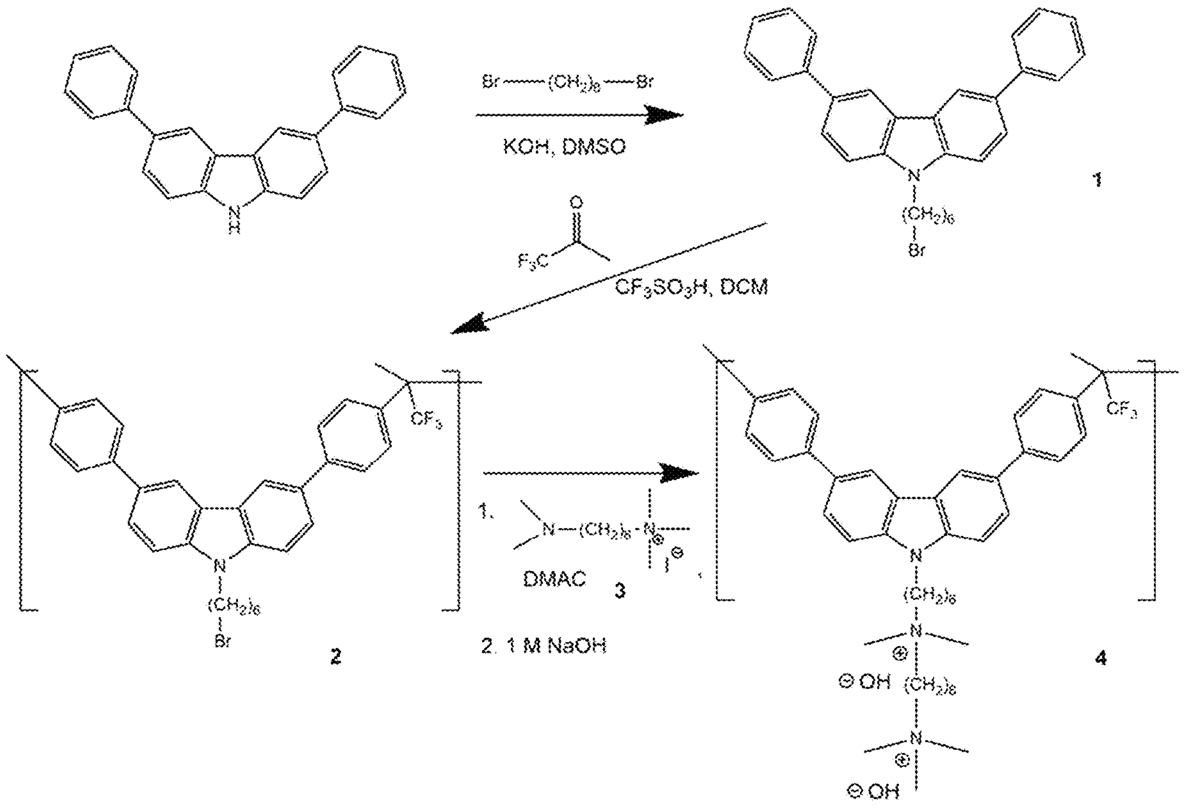
Figure 15B:
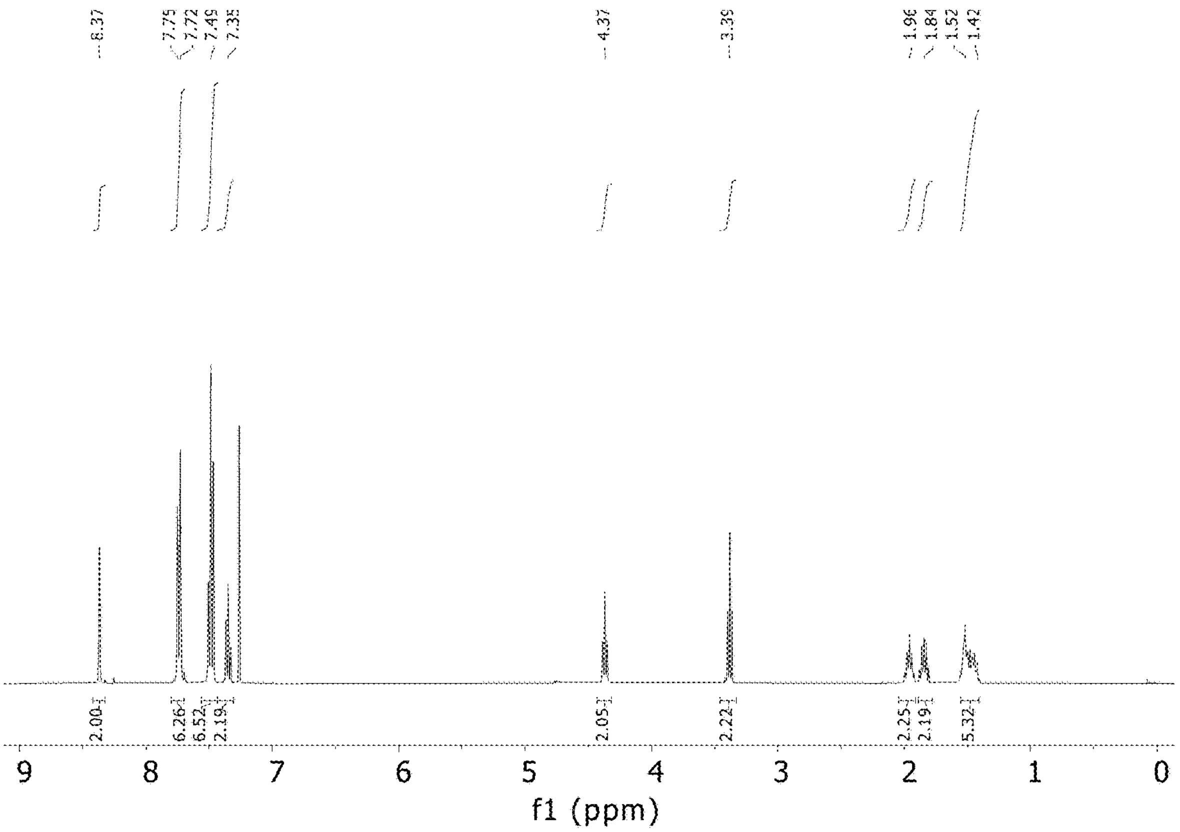
Figure 15C:
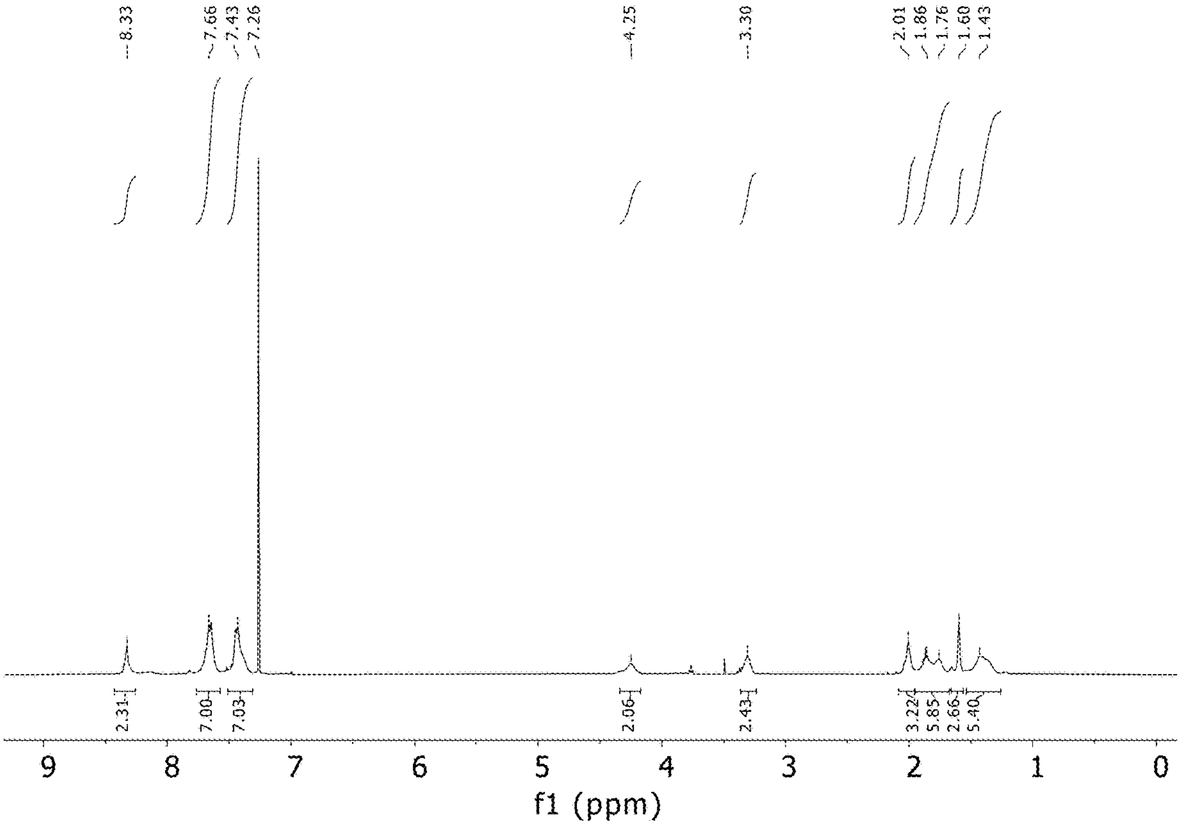
Figure 15D:
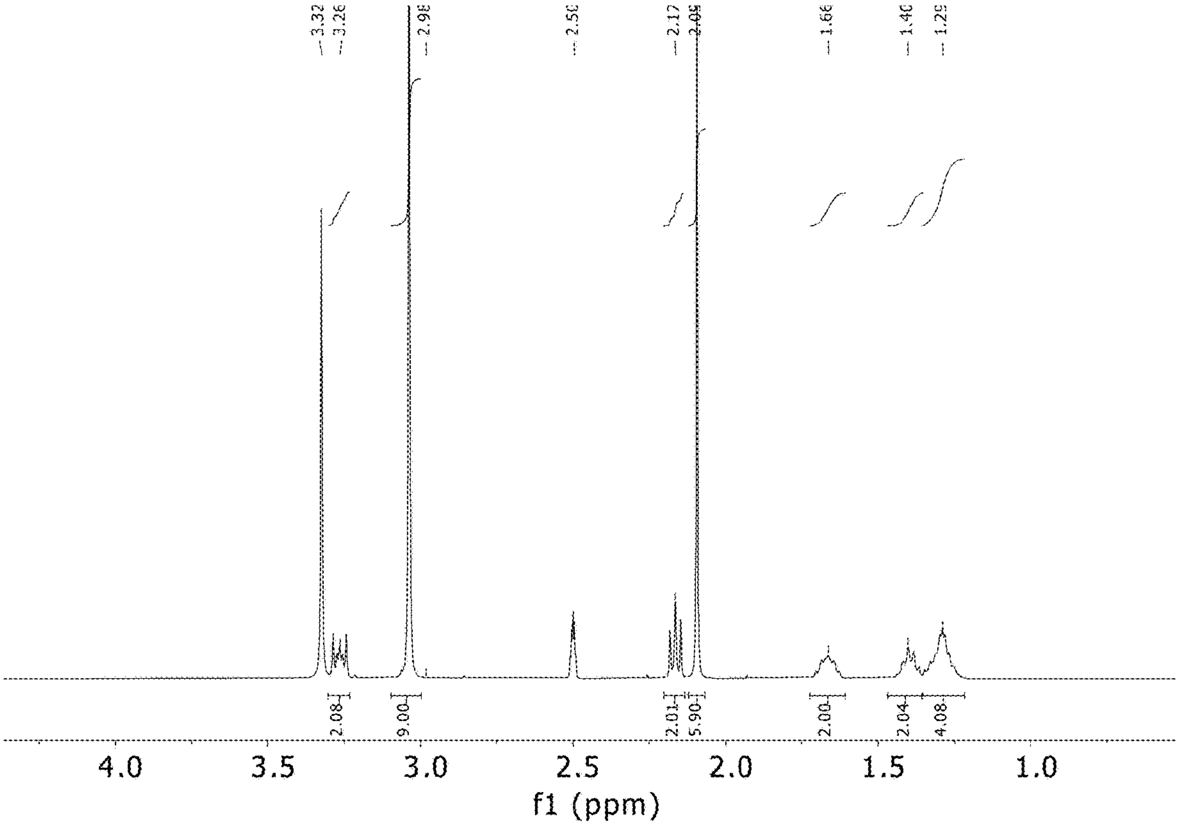
Figure 15E:
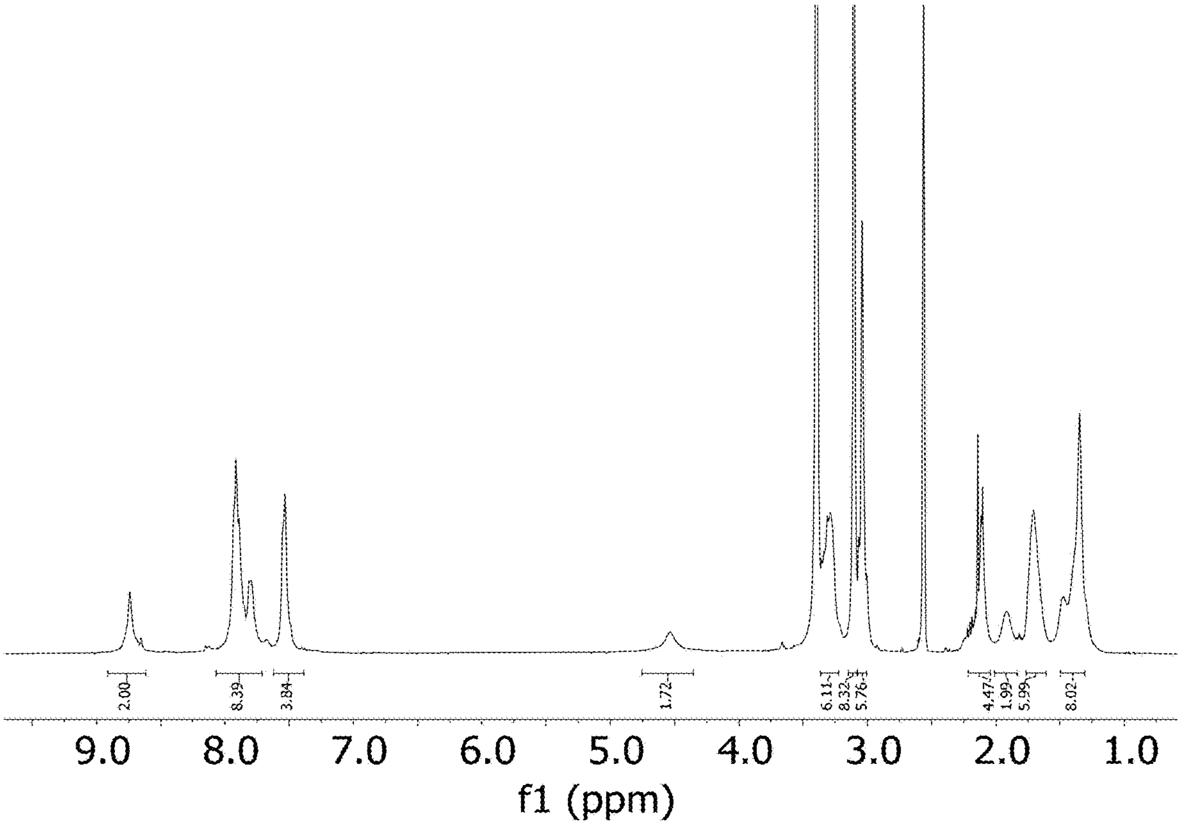

FIG. 15A depicts a synthetic scheme for a PDPC-2QA polymer prepared via the alternate route. FIGS. 15B-15E depict $^{1}H$ NMR spectra for certain intermediates/reactants and the final product of the synthesis.

Figure 16:
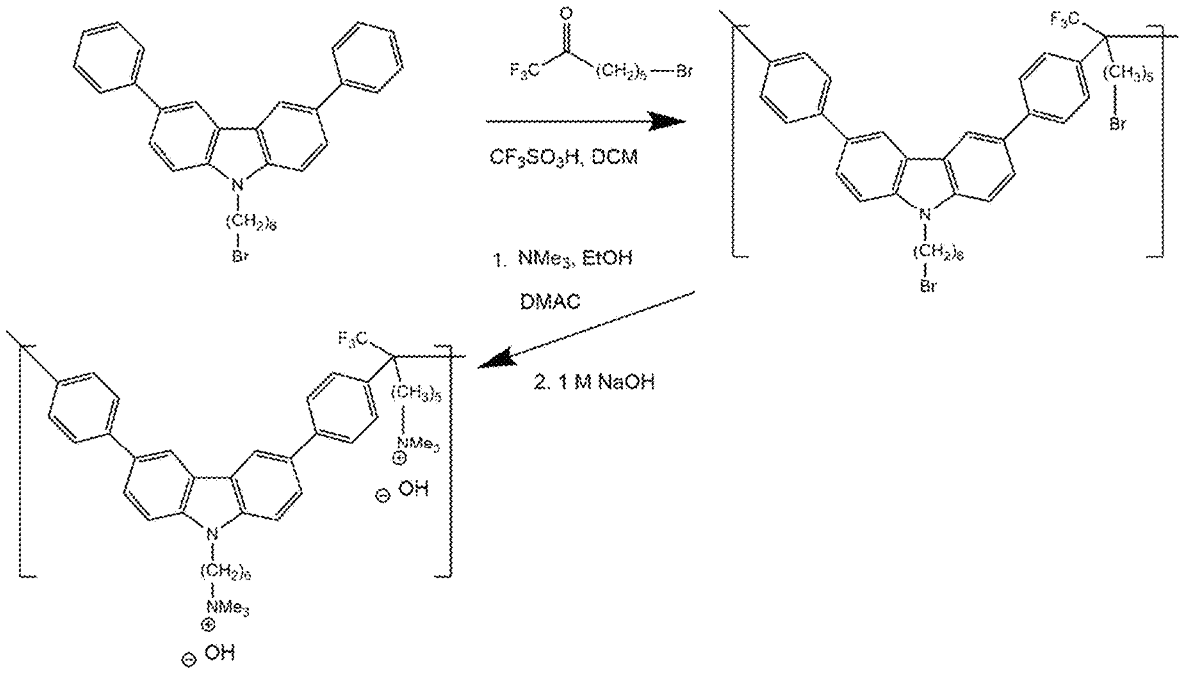

FIG. 16 depicts a synthetic scheme for a PDPC polymer having quaternized ammonium bound at two locations in each repeating unit.

Figure 17:
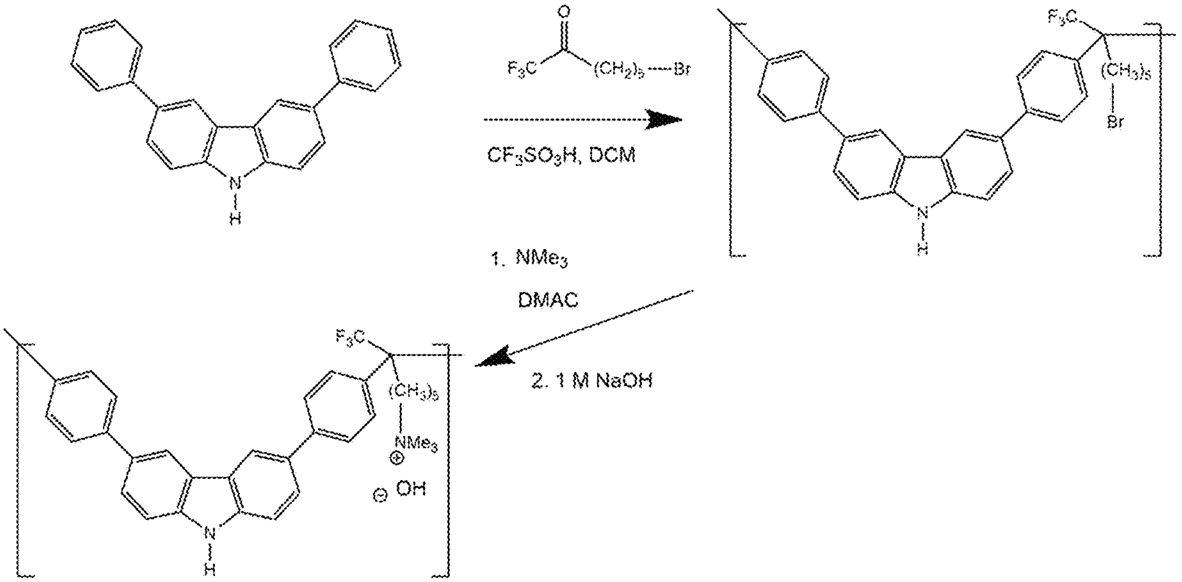

FIG. 17 depicts a synthetic scheme for a PDPC polymer having a quaternized ammonium bound directly to the backbone, but not to the carbazole.

DETAILED DESCRIPTION AND EXAMPLES

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout.

In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

All patents, patent publications, and references cited herein are incorporated herein by reference in their entireties.

It is understood that where a parameter range is provided, all integers and ranges within that range, and tenths and hundredths thereof, are also provided by the embodiments. For example, "5-10" includes 5, 6, 7, 8, 9, and 10; 5.0, 5.1, 5.2 . . . 9.8, 9.9, and 10.0; and 5.00, 5.01, 5.02 . . . 9.98, 9.99, and 10.00, as well as, for example, 6-9, 5.1-9.9, and 5.01-9.99.

For the purposes of the present application, the following terms shall have the following meanings:

As used herein, "alkyl" refers to a linear (i.e. unbranched), branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. The term "lower alkyl" intends an alkyl group of 1 to 6 carbon atoms, and the specific term "cycloalkyl" intends a cyclic alkyl group, typically having 3 to 8, preferably 5 to 7, carbon atoms. The term "substituted alkyl" refers to alkyl groups substituted with one or more substituent groups. If not otherwise indicated, the terms "alkyl" and "lower alkyl" include linear, branched, cyclic, unsubstituted, and/or substituted alkyl and lower alkyl groups, respectively.

As used herein, "alkoxy" refers to an optionally substituted alkyl group bound through a single, terminal ether linkage; that is, an "alkoxy" group may be represented as O-alkyl where alkyl is as defined above. A "lower alkoxy" group intends an alkoxy group containing 1 to 6 carbon atoms.

As used herein, "aromatic" refers to ring moieties which satisfy the Hückel 4n+2 rule for aromaticity, and includes both aryl (i.e., carbocyclic) and heteroaryl (also called heteroaromatic) structures, including aryl (e.g., phenyl), aralkyl (e.g., benzyl), alkaryl (e.g., tolyl), heteroaryl (e.g., pyridinyl), heteroaralkyl (e.g., pyridinylmethylene), or alkheteroaryl (e.g., methylpyridinyl) moieties, or oligomeric or polymeric analogs thereof.

The term "aryl" as used herein, and unless otherwise specified, refers to an optionally substituted aromatic substituent or structure containing a single aromatic ring or multiple aromatic rings that are fused together, directly linked, or indirectly linked (such that the different aromatic rings are bound to a common group such as a methylene or ethylene moiety). Unless otherwise modified, the term "aryl" refers to carbocyclic structures. Preferred aryl groups contain 5 to 24 carbon atoms, and particularly preferred aryl groups contain 6 to 14 carbon atoms. Exemplary aryl groups contain one aromatic ring or two fused or linked aromatic rings, e.g., phenyl, tolyl, naphthyl, bi-phenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom.

As used herein, "aralkyl" or "arylalkyl" refer to an alkyl group with an optionally substituted aryl substituent, wherein "aryl" and "alkyl" are as defined above. Preferred aralkyl groups contain 6 to 24 carbon atoms, and particularly preferred aralkyl groups contain 6 to 16 carbon atoms. Examples of aralkyl groups include, without limitation, benzyl, 2-phenyl-ethyl, and the like.

As used herein, "cyclic" and "ring" refer to alicyclic or aromatic groups that may or may not be substituted and/or heteroatom-containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic. The term "acyclic" refers to a structure in which the double bond is not contained within a ring structure.

As used herein, a "fluorinated" hydrocarbon comprises at least one fluoro substituent. A "perfluorinated" hydrocarbon is completely substituted with fluorine; in other words, each hydrogen has been replaced by a fluorine.

As used herein, "halogen" refers to any element in Group 17 of the periodic table. Non-limiting examples include F, Cl, Br, and I. A "halide" is a halogen atom bearing a negative charge. Non-limiting examples include $F^-$, $Cl^-$, $Br^-$, and $I^-$.

The terms "about" and "substantially" as used herein means a deviation (plus/minus) of less than 10%, and in particular, less than 5%, less than 4%, less than 3%, and less than 2% of the recited value.

An embodiment of the invention is a polymer having the structure:

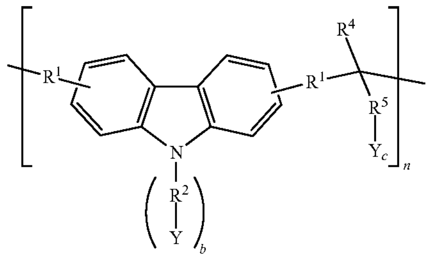

wherein each $R^1$ is independently a $C_6$-$C_{14}$ aryl;

$R^2$ is a $C_3$-$C_{24}$ alkyl;

$R^4$ is an unsubstituted, fluorinated, or perfluorinated $C_1$-$C_6$ alkyl;

$R^5$ is an unsubstituted, fluorinated, or perfluorinated $C_1$-$C_6$ alkyl;

Y is

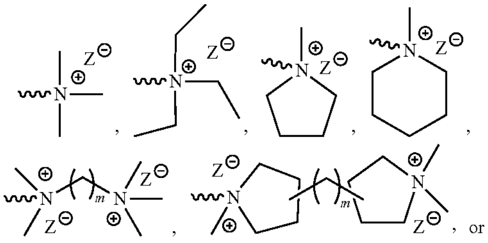

or

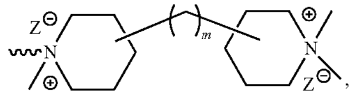

wherein Z is a counter ion, ∿∿ represents the point of attachment to the remainder of the polymer, and m is 4-12;

n is 2 to 10,000;

b is 0 or 1;

c is 0 or 1; and b+c=1 or 2.

It is understood that when b is 0, $R^2$—Y is not present, and when c is 0, the Y attached to $R^5$ is not present. It is also understood that, because b+c=1 or 2, at least one Y is always present.

In an embodiment, Y is

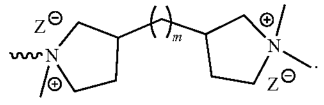

In an embodiment, Y is

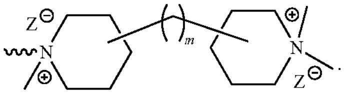

In an embodiment, the polymer has the structure

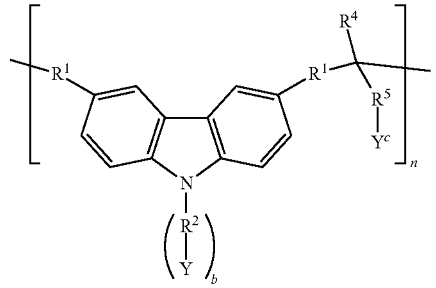

or

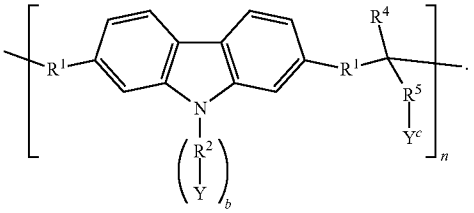

In an embodiment, each $R^1$ is independently a $C_6$-$C_{10}$ aryl. In an embodiment, each $R_1$ is independently selected from the group consisting of phenyl, benzyl, naphthalene, and biphenyl. In an embodiment, each $R^1$ is phenyl.

In an embodiment, $R^2$ is a $C_3$-$C_{12}$ alkyl. In an embodiment, $R^2$ is a $C_4$-$C_{10}$ or a $C_6$-$C_8$ alkyl. In an embodiment, $R^2$ is a branched alkyl. In an embodiment, $R^2$ is a linear alkyl. In an embodiment, $R^2$ is a $C_6$ alkyl.

In an embodiment, $R^4$ is an unsubstituted, fluorinated or perfluorinated $C_1$-$C_3$ alkyl. In an embodiment, $R^4$ is fluorinated. In an embodiment, $R^4$ is perfluorinated. In an embodiment, $R^4$ is $CF_3$.

In an embodiment, $R^5$ is an unsubstituted, fluorinated, or perfluorinated $C_1$-$C_3$ alkyl. In an embodiment, $R^5$ is unsubstituted. In an embodiment, $R^5$ is fluorinated. In an embodiment, $R^5$ is perfluorinated. In an embodiment, $R^5$ is $CH_3$.

In an embodiment, Z is selected from the group consisting of halides, $HCO_3^-$, and $OH^-$.

In an embodiment, n is at least or about 100; 200; 300; 400; 500; 600; 700; 800; 900; 1,000; 2,000; 3,000; 4,000; 5,000; 6,000; 7,000; 8,000; 9,000; 10,000; 11,000; 12,000; 13,000; 14,000; 15,000; 16,000; 17,000; 18,000; 19,000; 20,000; 25,000; 30,000; 35,000; 40,000; 45,000; or 50,000.

In an embodiment, b+c=1. In an embodiment, b+c=2.

In an embodiment, the polymer has a molecular weight from about 50 kDa to about 500 kDa. In an embodiment, the polymer has a molecular weight of at least or about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, or 400 kDa. In an embodiment, the polymer has a molecular weight from about 50 kDa to about 500 kDa.

An embodiment is an anion exchange membrane comprising a polymer as described above.

In an embodiment, the anion exchange membrane has a thickness of 10-200 μm.

An embodiment is a fuel cell or water electrolyzer, comprising an anion exchange membrane as described above.

In an embodiment, the fuel cell or water electrolyzer further comprises i) a porous transport layer;

ii) an oxygen electrode catalyst layer, wherein a first face of said oxygen electrode catalyst layer is adjacent to a face of said porous transport layer, and a second face of said oxygen electrode catalyst layer is adjacent to a first face of said anion exchange membrane;

iii) a hydrogen electrode catalyst layer, wherein a first face of said hydrogen electrode catalyst layer is adjacent to a second face of said anion exchange membrane; and iv) a gas diffusion layer adjacent to a second face of said hydrogen electrode catalyst layer.

An embodiment is a method of preparing a polymer as described above, said method comprising i) reacting a compound having the structure

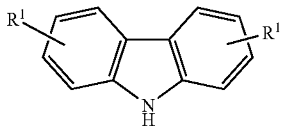

with a compound having the structure

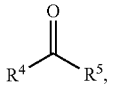

so as to form a polymer having the structure

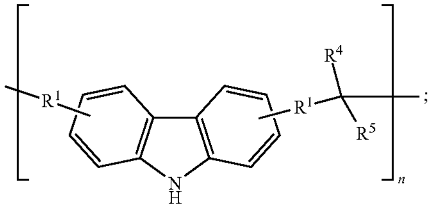

ii) reacting the polymer formed in step i) with a compound having the structure $X—R^2—Y''$, wherein Y" is

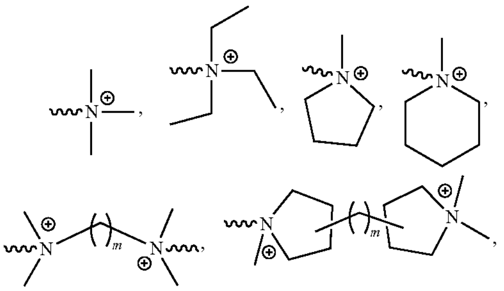

or

-continued

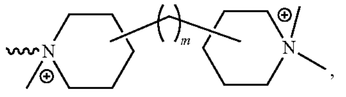

and m is 4-12, so as to form a polymer; and iii) reacting the polymer formed in step ii) with a base or salt comprising a counter ion Z, so as to form the polymer having the structure

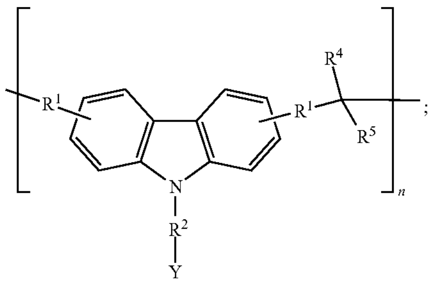

wherein X is a halogen.

In an embodiment, Y" is

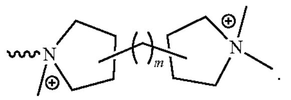

In an embodiment, Y" is

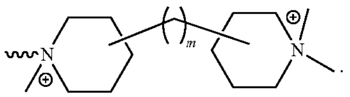

In an embodiment, X is Fl, Cl, Br, or I. In an embodiment, X is Br.

In an embodiment, step i) is performed in triflic acid. In an embodiment, step i) is performed in dichloromethane.

In an embodiment, step ii) is performed in the presence of a base and DMSO. A suitable base may be KOH, NaOH, NaH, or potassium tertbutoxide, as non-limiting examples.

In an embodiment, the compound added during step iii) is a base, or a salt. In an embodiment, said base is NaOH, KOH, NaH, or potassium tertbutoxide. In an embodiment, said salt is $KHCO_3$ or $NaHCO_3$. In an embodiment, an anion Z' in the additional compound becomes the counter ion Z in the structure of the polymer. Accordingly, when the counter ion Z is to be $OH^-$, the additional compound may be a hydroxide, such as NaOH or KOH, as nonlimiting examples. When the counter ion Z is to be $HCO_3^-$, the additional compound may be $KHCO_3$ or $NaHCO_3$, as nonlimiting examples.

Another embodiment is a method of preparing a polymer as described above, said method comprising:

i) reacting a compound having the structure

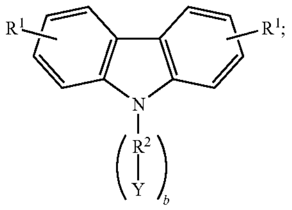

with a compound having the formula

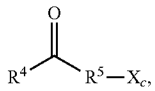

so as to form a polymer having the structure

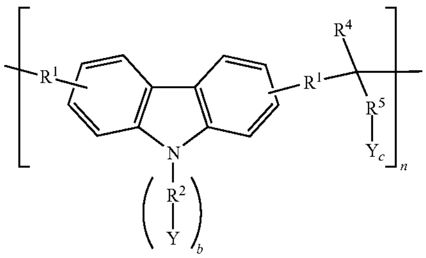

wherein each X is independently a halogen;

ii) reacting the polymer formed in step i) with Y', where Y' is,

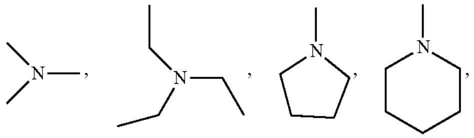

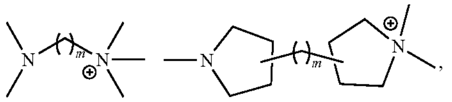

or

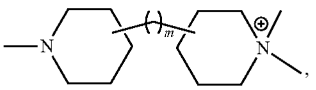

and m is 4-12, so as to form a polymer; and iii) reacting the polymer formed in step ii) with a base or salt comprising a counter ion Z, so as to form the polymer having the structure

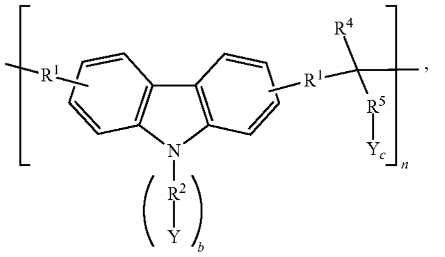

wherein b is 0 or 1;

c is 0 or 1; and b+c=1 or 2.

A schematic representation of a membrane electrode assembly (MEA) configuration as present in a fuel cell or water electrolyzer using an AEM of the invention, for operation in constant gas mode, is shown in FIG. 1. In the center of the MEA 100 is the anion exchange membrane (AEM) 108. On the oxygen electrode (not pictured) side of the AEM 108 is the oxygen electrode catalyst layer 106. Adjacent to the oxygen electrode catalyst layer 106, opposite the AEM 108, is the PTL 102.

On the hydrogen electrode (not pictured) side of the AE M 108 is the hydrogen electrode catalyst layer 110. Adjacent to the hydrogen electrode catalyst layer 110, opposite the AEM 108, is the gas diffusion layer 112.

Anion Exchange Membrane

The anion exchange membrane comprises a carbazole-derived polymer with at least one quaternized ammonium (QA) as described above.

Porous Transport Layer

The porous transport layer (PTL) is typically composed of a porous, corrosion-resistant metal or metals such as Ti, instead of the carbon-based gas diffusion layers used in conventional fuel cells. In an embodiment, the PTL comprises a metal selected from the group consisting of titanium, stainless steel, copper, and nickel. In an embodiment, the PTL consists of a metal comprising a protective coating. Non-limiting examples of suitable coatings include platinum, iridium, gold, and titanium nitride. The PTL may be in any form which allows for free transport of water and oxygen. In an embodiment, the substrate is a sinter, mesh, foam, or felt.

In a preferred embodiment, the thickness of the PTL is from 40-600 μm.

In an embodiment, the PTL is wet-proofed. This involves coating the PTL with a hydrophobic coating. In an embodiment, the hydrophobic coating comprises a fluoropolymer. In a preferred embodiment, the fluoropolymer is fluorinated ethylene propylene (FEP).

Catalyst Layers

The hydrogen electrode catalyst layer comprises an HOR catalyst and a HER catalyst. In an embodiment, the HOR catalyst and the HER catalyst are different. In an embodiment, the HOR catalyst and the HER catalyst are the same. In an embodiment, the HOR catalyst is selected from the group consisting of platinum with a carbon support, platinum black, and platinum nanoparticles. In an embodiment, the HER catalyst is selected from the group consisting of platinum with a carbon support, platinum black, and platinum nanoparticles.

Similarly, the oxygen electrode catalyst layer comprises an OER catalyst and an ORR catalyst. In an embodiment, the OER catalyst and the ORR catalyst are different. The catalysts utilized for the oxygen electrode are typically unsupported platinum black mixed with iridium oxide (or iridium black), or Pt/Ir catalyst supported on metal, metal oxide, or metal nitride particles. Conventional catalyst supports based on carbon cannot be used on the oxygen electrode since carbon corrodes rapidly at the high potentials applied during WE mode operation. In an embodiment, the OER catalyst and the ORR catalyst are the same.

Gas Diffusion Layer (GDL)

The gas diffusion layer may be comprised of any material known in the art as suitable for use in a fuel cell. In an embodiment, the gas diffusion layer is a carbon cloth.

Discussion and Experimental

One strategy to mitigate the adverse interaction of phenyl group on the catalyst surface is to develop AEMs with non-rotatable fused aromatic groups such as fluorene that have a less adverse interaction with the catalyst surface.

However, polyfluorene-based anion-conducting polymers with low phenyl adsorption energy are difficult to use as a membrane because of poor film-forming properties. Modified poly(fluorene)s may produce good film-forming quaternized polyfluorenes. However, the synthetic procedure of the polyfluorene AEMs require a multi-step synthesis of monomers involving precious metal catalysts. Quaternized poly(carbazole)s are another AEM material that have non-rotatable phenyl groups, high conductivity, and excellent alkaline stability. However, the cost of the 9-(6-bromohexyl)-9H-carbazole monomer for the reported quaternized polycarbazole polymers is high and their competitiveness to other promising AEMs have not been fully investigated.

Here is reported quaternized poly(carbazole) homopolymers from a facile acid-catalyzed Friedel Crafts polycondensation reaction using 3,6-diphenyl-9H-carbazole followed by a grafting reaction. The degree of functionalization of the grafting reaction is discussed in terms of the alkyl ammonium chain length. The properties of the quaternized poly(carbazole) homopolymer are evaluated and compared to other state-of-the-art AEMs. Finally, the devices' performance was reported to prove the potential use of this material in practical systems.

Materials and Methods

All reagents and solvents were purchased from Sigma Aldrich, Acros, TCI America, Ambeed, and Alfa Aesar and were used without further purification. PiperION™ and CMX were purchased from Versogen and Orion respectively. HMTA-DAPP membranes were obtained from Sandia National Laboratory. Polynorbornene ionomers were obtained from Oak Ridge National Laboratory. 6-bromo-N,N,N-trimethylhexan-1-aminium bromide (6-BrQA) was prepared following the procedure reported in Du et al., "Synthesizing spindle-shaped anion exchange membranes to improve conductivity and stability," *International Journal of Hydrogen Energy* 2020, 45 (20), 11814-11823.

$^1H$ NMR spectra were collected from Bruker 400 NMR spectrometer at room temperature, and chemical shifts were referenced to the solvent residue peaks of DMSO-$d_6$ at 2.50 ppm. For $^{19}F$ NMR, trifluoroacetic acid was used as standard and the chemical shifts were referenced to the trifluoroacetic acid peak at −76.55 ppm. GPC was performed on Agilent 1260 Infinity II with refractive index detector (G7801A) with THF as eluent and polystyrene as standards at 40° C. with a flow rate 1.0 mL $min^{-1}$. TGA measurements were performed using a high-resolution thermogravimetric analyzer TA instrument Model Q-50, within the temperature interval of 25-600° C., with a rate of 5° C. $min^{-1}$ under air. AC impedance spectroscopy on a Solartron 1260 gain phase analyzer in the 1 MHz to 1 Hz frequency range was used to measure the ion conductivities of polymer membranes.

To study the reactivity of PDPC and 3-BrQA or 6-BrQA, the Gibbs free energy change and Gibbs fee activation energy for the elimination (E2) and substitution reaction ($S_N2$) mechanism were calculated. PDPC polymer was modeled as a carbazole fragment, while 3-BrQA and 6-BrQA were modeled as cations with Br counterion. All the electronic structure calculation were performed using the B3LYP/6-311++G(2d,2p) level theory as implemented in Gaussian16 quantum chemistry program revision C.02. In all the cases, the structures or reactants, products, and transition states were optimized using tight option i.e., tight convergence criteria were used both for the electronic energy calculations and geometry optimizations. The change in the Gibbs free energy was calculated by performing the frequency analysis. The reactant and product geometries were confirmed to have all real frequencies while the transition states geometries were confirmed to have one normal mode with imaginary frequency. The solvent effect of DMSO was taken into account by using the Polarizable Continuum Model with the integral equation formalism variant as implemented in Gaussian 16 (Miertuš et al., "Electrostatic Interaction of a Solute with a Continuum. A Direct Utilization of ab initio Molecular Potentials for the Prevision of Solvent Effects," *Chem. Phys.* 1981, 55, 117-29, and Cossi et al., "Ab initio study of solvated molecules: A new implementation of the polarizable continuum model," *Chem. Phys. Lett.,* 1996, 255, 327-35).

Synthesis of precursor polymer (PDPC). A 50 mL of one neck round bottomed flask was charged with 3,6-diphenyl-9H-carbazole (1 g, 3013 mmol), 1,1,1-trifluoroacetone (0.42 g, 3.75 mmol), and a magnetic stir bar and cooled in an ice bath. Dichloromethane (2 mL) was added and stirred for 10 minutes followed by dropwise addition of triflic acid (6 mL). The ice bath was removed and the reaction mixture was stirred at room temperature for 1 hour which was then precipitated in methanol (50 mL) to obtain polymer fiber. The fibrous polymer was collected by vacuum filtration, dissolved in tetrahydrofuran, and reprecipitated in methanol to obtain light blue polymer (PDPC, 1.4 g, 94% yield).

$^1H$ NMR (400 MHz, DMSO-d6, δ ppm): 11.40 ($H_g$), 8.52 ($H_d$), 7.74-7.72 ($H_c$), 7.68-7.66 ($H_f$), 7.54-7.52 ($H_e$), 7.27-7.35 ($H_b$), 1.93 ($H_a$). $^{19}F$ NMR (376 MHz, DMSO-d6, δ ppm): −69.57 ($CF_3$)

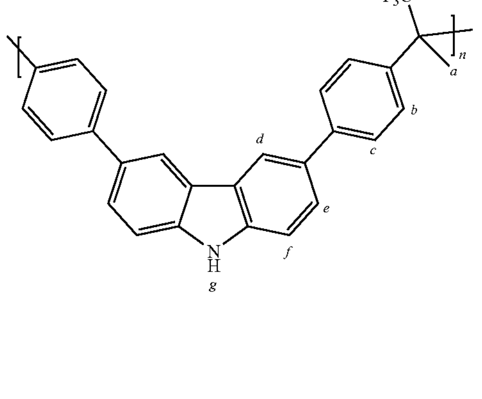

General grafting procedure. The alkyl ammonium grafted polymers, PDPC-nQA were synthesized by grafting the precursor polymer, PDPC with n-bromo-N,N,N-trimethylalkan-1-aminium bromide in presence of potassium hydroxide. The general procedure is described below for 500 mg of precursor polymer.

In a 100 mL of one neck round bottomed flask, precursor polymer, PDPC (0.5 g) and potassium hydroxide (0.17 g, 3.0 mmol) were taken with a magnetic stir bar. DMSO (20 mL) was added to the flask and the reaction mixture was stirred till the polymer got completely soluble followed by the addition of DI water (1 mL). In a 20 mL vial, n-bromo-N,N,N-trimethylalkan-1-aminium bromide (3.61 mmol) was dissolved in DMSO (2 mL). The solution of n-bromo-N,N,N-trimethylalkan-1-aminium bromide was then added to the reaction mixture and stirred vigorously at 50° C. After 12 h, the reaction mixture was cooled down to room temperature and precipitated in cold 1 M NaCl aqueous solution. The precipitated was filtered, washed with DI water, and dried to obtain brownish polymer.

PDPC-6QA: $^1H$ NMR (400 MHz, DMSO-d6, δ ppm): 8.65 ($H_d$), 7.85-7.81 ($H_c$, $H_f$), 7.73-7.71 ($H_e$), 7.48-7.46 ($H_b$), 4.46 ($H_g$), 3.23 ($H_l$), 3.00 ($H_m$), 2.04 ($H_a$), 1.85 ($H_h$), 1.60 ($H_k$), 1.39 ($H_i$), 1.29 ($H_j$). $^{19}F$ NMR (376 MHz, DMSO-d6, δ ppm): −69.63 ($CF_3$)

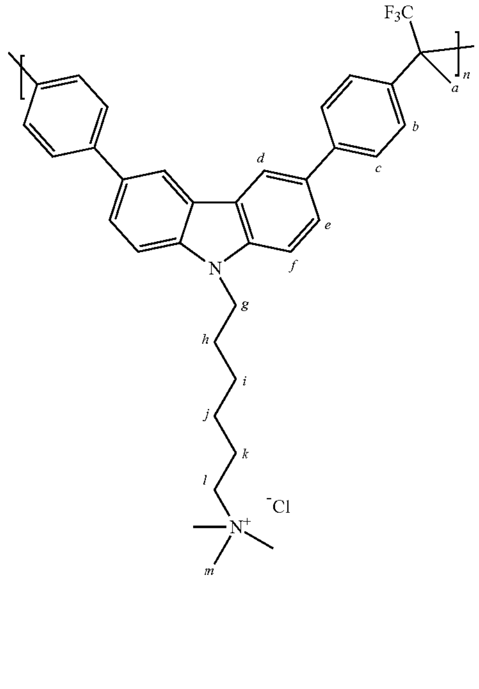

PDPC-3QA: $^1H$ NMR (400 MHz, DMSO-d6, δ ppm): 11.55 ($H_g$), 8.65-8.58 ($H_d$, $H_{d'}$), 7.83 ($H_c$, $H_{c'}$, $H_e$, $H_{e'}$, $H_f$), 7.85 ($H_{f'}$), 7.45 ($H_b$, $H_{b'}$), 4.53 ($H_h$), 3.53 ($H_j$), 3.07 ($H_k$), 2.27 ($H_i$), 2.03 ($H_a$, $H_{a'}$) $^{19}F$ NMR (376 MHz, DMSO-d6, δ ppm): −69.67 ($CF_3$)

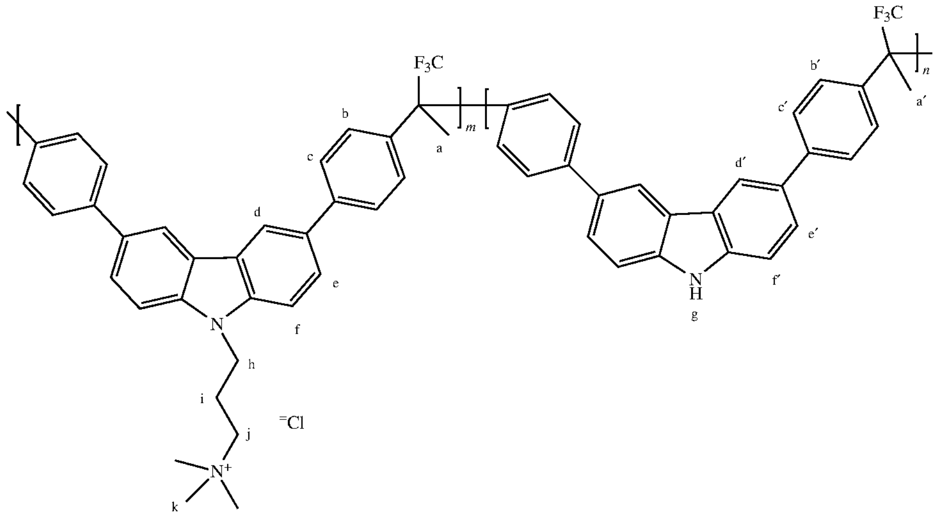

IEC measurement. IEC of the polymer membranes was determined by Mohr titration. Fully dried polymer membrane in chloride form was weighed out and then immersed in 0.5 M $NaNO_3$ for at least 24 hours. The $NaNO_3$ solution was collected and titrated with 0.1 M $AgNO_3$, using a few drops of $K_2CrO_4$ as a colorimetric indicator. The IEC (meq. $g^{-1}$) value was obtained from the calculated mass of the membrane in hydroxide form and the amount $AgNO_3$ consumed in the titration using the following equation;

$$IEC = \frac{V \times 0.1}{W}$$

where V (mL) is the volume of $AgNO_3$ consumed during titration, and W (g) is the mass of the dried polymer membrane in the hydroxide form.

Water Uptake, swelling ratio, and hydration number measurement. Water uptake and swelling ration in hydroxide form were carried out using degassed, deionized water. For water uptake, approximately 100 mg of membrane was soaked in 1 M NaOH solution for 24 hours to convert the counter ion in $OH^-$ ion form and washed with degassed water several times and soaked in degassed water for another 24 hours. The fully hydrated AEMs (in $OH^-$ form) were taken out of water, blotted quickly with a KimWipe to remove surface water, and weighed immediately. The counter ion was then converted to chloride form and dried at 50° C. under vacuum for 24 h and weighed again. The dry mass of the membrane in hydroxide form was calculated from the dry mass of the membrane in chloride to prevent degradation and carbonate formation. The water uptake (WU) was calculated as $$WU(\%) = (W_{wet} - W_{dry})/W_{dry} \times 100$$

where $W_{wet}$ and $W_{dry}$ are the weights of the wet and dry membranes in hydroxide form, respectively.

The hydration number (k), average number of water molecules per ionic group, was calculated as $$\lambda = [(W_{wet} - W_{dry})/W_{dry}] \times 1000/M_{H2O}IEC$$

where $M_{H2O}$ is the molecular mass of water (18 g/mol).

The swelling ratio (SW) was characterized in terms of linear expansion ratio, which was calculated as the ratio of the difference between the wet and dry dimensions to the dry dimensions in hydroxide ion form:

$$SW(\%) = (D_{wet} - D_{dry})/D_{dry} \times 100$$

where $D_{wet}$ and $D_{dry}$ are the diagonal of wet and dry membranes respectively.

Conductivity measurement. Hydroxide conductivity measurements of AEMs were carried out using AC impedance spectroscopy on a Solartron 1260 gain phase analyzer in the 1 MHz to 1 Hz frequency range in degassed deionized water. Measurements were carried out at 0, 60, and 80° C. and at a given temperature, the membrane sample was equilibrated for 15 minutes before measurements were recorded. Conductivity ($\sigma$, mS $cm^{-1}$) was calculated from the equation below:

$$\sigma = \frac{L}{R \times A}$$

where L (cm) is the distance between the electrode faces, R(mΩ) is the resistance at the intercept between the Re (Z) axis and the high-frequency complex impedance plane, and A ($cm^2$) is the area of the electrode face.

Alkaline-stability test. The alkaline stability testing of the polymer membranes was conducted by immersing the membranes (~100 mg) in 1 M NaOH aqueous solution at 80° C. for 250 and 500 hours. After alkaline stability tests, membranes were washed with deionized water several times, and the counter anion was exchanged to $Cl^-$ to determine the IEC by Mohr titration. The alkaline stability was evaluated by comparing the $^1$H NMR, titrated IEC, and conductivity of the ionomer samples before and after the alkaline stability test.

MEA fabrication and AEMFC performance assessment. Polynorbornene ionomer (IEC=2 meq./g) provided by Dr. Tomonori Saito at Oak Ridge National Laboratory was used for the catalyst binder. Catalyst ink solutions were prepared by combining 20 mg of 75 wt. % metal PtRu/C (Alfa Aesar) catalyst for the anode, or 60 wt % Pt/C, with 69.2 mg of 5 wt % polynorbornene ionomer solution and 2 g of 80/20% 2-propanol/Milli-Q water solution. Gas diffusion electrodes (GDEs) were prepared by hand-painting the catalyst ink solution on a 5 cm$^2$ gas diffusion layer (SGL-22BB, Sigracet) on a vacuum plate at 60° C. The resulting loading was 0.5 mg$_{Pt}$/cm$^2$ for the anode and 0.6 mg$_{Pt}$/cm$^2$ for the cathode.

AEMFC performance was tested using the prepared MEAs. Prior to assembly into the test cell, the GDEs, and PDPC-6QA membrane (35 mm thickness) were soaked in a 1 M NaOH solution for 2 h. The components were then assembled into a 5 cm$^2$ single-serpentine test cell from Fuel Cell Technologies with 180 μm reinforced gaskets and torqued to 50 in-lbs. The cell was attached to a Fuel Cell Technologies test station and brought up to 60° C. without gas flow. Once reaching 60° C., reactant gas flows of 500 sccm $H_2$ and $O_2$ were introduced with 100% RH at 148 kPa$_{abs}$ backpressure, and a cell voltage of 0.5 V was applied. Once the cell reached 80° C. the reactant gas flow rates were increased to 1400/700 sccm anode/cathode, and RH remained 100%. The cell was kept at constant voltage until current and high frequency resistance (HFR) stabilized, ~2 h. Once stabilized, RH conditions were modified until the optimal performance was obtained. Following this break-in procedure, the cell was cooled to room temperature, removed from the test station, and flushed with 6 mL of NaOH solution on the anode and cathode. The cell was sealed and allowed to sit overnight at ambient conditions. The cell was again flushed with 3 mL of 1 M NaOH on the anode and cathode, followed by 6 mL of Milli-Q water anode and cathode. The warm-up procedure for the cell was the same as the break-in on the previous day. Once current and HFR stabilized, and optimal RH conditions found, cell performance was determined using polarization curves obtained at 148 kPa$_{abs}$ backpressure.

MEA fabrication and AEMWE performance assessment. PDPC-6QA membranes (35 mm thickness) were soaked in a 1 M NaOH solution at 85° C. for 2 h before assembly into the test cell. Polynorbornene ionomer (IEC=2 meq./g) provided by Dr. Tomonori Saito at Oak Ridge National Laboratory was used for the catalyst binder. The catalysts; $IrO_2$ (2.3 mg/cm$^2$, Thermoscientific, Premion 99.99% metals basis) and PtRu/C (1.8 mg/cm$^2$, Alfa Aesar, 50 wt % Pt, 25 wt % Ru) were used on the anode and cathode respectively with 9 wt % ionomer in the catalyst layer. MEAs were tested by first flowing 1 M NaOH through the cell at 60° C., after 100 mL solution were supplied to both anode and cathode, the supply to the cathode was removed and 1 M NaOH at 10 mL/min was supplied only to the anode. Polarization curves from 1.3 to 1.8 V were collected at 20 mV/s until stable before flushing the cell with 500 mL boiled water. After flushing with boiled water, the water was replaced and polarization curves from 1.3 to 2 V, 20 mV/s scan rate, at 60 and 80° C. were collected.

Synthesis Results and Discussion

A first attempt to polymerize carbazole and trifluoroacetone by acid-catalyzed Friedel Crafts polycondensation reaction was not successful, because the protonation of nitrogen in carbazole by triflic acid led to the electron-deficient carbazole ring which is not very reactive towards Friedel Crafts reaction. Thus, 3,6-diphenyl-9H-carbazole was used as a monomer to synthesize the precursor polymer. A high molecular weight precursor polymer, PDPC ($M_w$>100,000 g/mol) (Table 1) was obtained within an hour of polymerization reaction between 3,6-diphenyl-9H-carbazole and trifluoroacetone in presence of triflic acid (trifluoromethanesulfonic acid) (FIG. 2A).

TABLE 1

Molecular weight and thermal properties of PDPC and PDPC-nQA.

| Polymer | $M_n{}^a$ | $M_w{}^a$ | Đ$^{a, b}$ | $T_d{}^c$ (°C) |
|---|---|---|---|---|
| PDPC | 51 | 105 | 2.06 | 465 |
| PDPC-3QA | NA | NA | NA | 197, 468 |
| PDPC-6QA | NA | NA | NA | 198, 466 |

[a]Obtained using GPC with polystyrene standard and measured in g/mol
[b]Polydispersity index ($M_w$/$M_n$)

PDPC showed good solubility in common aprotic solvents such as tetrahydrofuran, dimethylsulfoxide, and dimethylacetamide (Table 2).

TABLE 2

Solubility of PDPC and PDPC-nQA

| Sample | DMSO | DMF | DMAc | MeOH | EtOH | THF | Water |
|---|---|---|---|---|---|---|---|
| PDPC | + | + | + | − | − | + | − |
| PDPC-3QA | + | + | + | − | − | − | − |
| PDPC-6QA | + | + | + | − | − | − | − |

Polymer solubility tested in 5 wt/v %.

(+) indicates polymer is soluble.

(−) indicates polymer is insoluble.

DMSO: dimethylsulfoxide; DMF: dimethylformamide,

DMAc: dimethylacetamide, THF: tetrahydrofuran, MeOH: methanol, EtOH: ethanol.

The chemical structure of PDPC was confirmed by $^1$H NMR and $^{19}$F NMR spectroscopy (FIGS. 2B and 2C). In the next step, the targeted AEMs, (PDPC-nQA, where n denotes the carbon chain length) were successfully synthesized by grafting with either 6-bromo-N,N,N-trimethylhexan-1-aminium bromide (6-BrQA) or 3-bromo-N,N,N-trimethylpropan-1-aminium bromide (3-BrQA) on PDPC. With 6-BrQA, 100% grafting was achieved to form PDPC-6QA, which was confirmed by the complete disappearance of the N—H proton peak at 11.39 ppm and the presence of proton peaks corresponding to the side chains in the $^1$H NMR spectra of PDPC-6QA (FIG. 2B). However, grafting with 3-BrQA to synthesize PDPC-3QA was 60% as confirmed by the presence of the proton peaks corresponding to the side chain along with the N—H proton peak in the $^1$H NMR spectrum of the grafted polymer, PDPC-3QA (FIG. 2B).

The partial grafting with 3-BrQA could be due to the highly acidic nature of the β-hydrogen on 3-BrQA, resulting from the proximity of bromide and trimethyl ammonium group, which leads to the competition between substitution ($S_N2$) and elimination (E2) reactions of bromide on 3-BrQA. While the $S_N2$ reaction leads to the desired grafting on precursor polymer, the E2 reaction leads to eliminated ammonium products. (FIG. 3A). The presence of peaks corresponding to the eliminated products in the $^1$H NMR spectra of the reaction mixture during the grafting of the precursor polymer, PDPC with 3-BrQA and 6-BrQA (FIG. 3B) confirmed the occurrence of the E2 reaction. Compared to 3-BrQA, the E2 reaction on 6-BrQA was minimal (FIG. 3B). The barrier energy ($\Delta_r G^{\ddagger}$) difference between the E2 and $S_N2$ reactions based on the Boltzmann distribution of transition states supports an incomplete grafting reaction for 3-BrQA (FIG. 4). While the activation energies for the E2 and SN2 reactions on 3-BrQA are similar ($\Delta_r G^{\ddagger}$=−88 kJ/mol), the barrier energy for the E2 on 6-BrQA is found to be higher (($\Delta_r G^{\ddagger}$=99.7 kJ/mol) compared to the SN2 reaction $\Delta_r G^{\ddagger}$=91.8 kJ/mol) (FIG. 4 and FIG. 3C). Note that there is distinct difference from common ammonium-benzyl bromide grafting reaction of polyaromatics where there is no beta hydrogen in the benzyl bromide.

The water uptake (WU) and swelling ratio (SR) of PDPC-6QA and PDPC-3QA in $OH^-$ and $Cl^-$ forms were measured at 30, 60, and 80° C. in $OH^-$ form. Filled symbols represent swelling ratio and unfiled symbols represent water uptake. PDPC-6QA showed higher WU and SW at all temperature ranges due to having higher IEC. As expected, there was an increase in WU and SW with temperature in both AEMs (FIG. 5 and Table 3).

TABLE 3

Water uptake, swelling ratio, and conductivity of PDPC-nQA in $Cl^-$ ion form.

| | Water Uptake (wt. %) | | | Swelling Ratio (%) | | | Conductivity (mS/cm) | | |
|---|---|---|---|---|---|---|---|---|---|
| Polymer | 30 °C | 60 °C | 80 °C | 30 °C | 60 °C | 80 °C | 30 °C | 60 °C | 80 °C |
| PDPC-3QA | 7 | 11 | 13 | 3 | 4.5 | 6 | 5 (2.1) | 8 (3.2) | 10 (4.3) |
| PDPC-6QA | 12 | 16 | 18 | 6 | 9 | 11 | 15 (14) | 33 (31) | 43 (42) |

Data are average of three measurements.

Data in the parenthesis is after 500 h of alkaline stability test in 1 M NaOH and at 80° C.

When compared to the other AEMs with similar IECs, these WU and SW values were lower. This could be attributed to the homopolymer architecture with a rigid aromatic polymer backbone i.e., diphenyl carbazole, grafted with a flexible tether chain. The hydroxide conductivity of PDPC-6QA (103 mS $cm^{-1}$) was higher than that of PDPC-3QA (51 mS $cm^{-1}$) due to the high IEC. Both AEMs follow the Arrhenius relationship of the temperature dependence of hydroxide conductivities (FIG. 6). The thermal stability of PDPC and two AEMs (PDPC-3QA and PDPC-6QA) was evaluated using TGA at the heating rate of 5° C. $min^{-1}$. The TGA curves and their corresponding first derivatives were measured under air, and are shown in FIGS. 7A and 7B, respectively, and the data are summarized in Table 1. While PDPC showed a single thermal decomposition temperature (Td) at 465° C., the two AEMs showed two distinct Td at around 200° C. and 466° C. corresponding to the decomposition of the ammonium group and polymer backbone, respectively. The mechanical properties of these AEMs were assessed by measuring their tensile stress-strain under ambient conditions (25° C. and 30% relative humidity) in $Cl^-$ ion form. Both AEMs showed robust mechanical properties with maximum elongation of 75% and 33% for PDPA-6QA and PDPA-3QA respectively with a tensile stress of 47 and 71 MPa (Table 4 and FIG. 8). The lower elongation and higher tensile strength for PDPA-3QA compared to PDPA-6QA is attributed to the lower IEC of PDPC-3QA resulting in lower water uptake and thus less plasticizing effect.

The alkaline stability test conducted by immersing in 1 M NaOH aqueous solution at 80° C. for 500 hours indicated that PDPC-6QA has excellent alkaline stability as no notable chemical structure changes were observed in the $^1$H NMR spectra (FIG. 9). Similarly, the IEC and conductivity change of this AEM was <3% (Table 4). This excellent alkaline stability of PDPC-6QA is attributed to the aryl ether-free polyaromatic backbone with a chemically stable ammonium group tethered to the polymer backbone with a long spacer (6 carbons chain). However, notable chemical structure changes were observed for PDPC-3QA (FIG. 10A, Table 1).

TABLE 1

Properties of Polycarbazole AEMs

| | IEC (meq. g − 1) | | | WU[b] | | in-plane | $\sigma^b$ | mechanical properties[d] | | alkaline stability[e] | |
|---|---|---|---|---|---|---|---|---|---|---|---|
| polymer | theo.[a] | NMR | titration | (wt. %) | $\lambda^{b,c}$ | swelling (%)[b] | (mS $cm^{-1}$) | Stress (MPa) | Strain (%) | IEC change (%) | $\sigma^f$ change |
| PDPC-6QA | 1.74 | 1.74 | 1.72 | 32 ± 5 | 10.3 | 18 ± 4 | 103 ± 3 | 47 | 75 | 0 | 3 |
| PDPC-3QA | 1.88 | 1.24 | 1.25 | 19 ± 3 | 8.4 | 10 ± 2 | 51 ± 2 | 71 | 33 | 44 | 57 |

[a]Theoretical values were calculated considering 100% functionalization with quaternized side chain.
[b]Values taken for $OH^-$ ion at 80 °C.
[c]Hydration number (λ).
[d]Measured in $CL^-$ ion form under ambient conditions (25 °C and 30% relative humidity).
[e]Measured after immersing the AEMs at 80 °C in 1M NaOH solution for 500 hours.
[f]Values taken for chloride ion 80 °C.

The presence of additional peaks around 5.95 and 5.01 ppm in $^1$H NMR spectra after the alkaline stability test suggested that the change in chemical structure resulted from the Hofmann elimination of the terminal ammonium group under high alkaline conditions at elevated temperature. The observed reactivity can be explained by higher acidity of the β-proton resulting from the proximity of the ammonium group and aromatic amine group of the polymer backbone and due to the less steric hindrance of the shorter alky chain (FIG. 10B). The higher alkaline stability of the longer alkyl side chain tethered AEM agrees well with previous reports.

With excellent alkaline stability, good mechanical properties, and high hydroxide conductivity, PDPC-6QA was evaluated for application in AEM fuel cell and water electrolyzer. FIG. 11A shows the polarization curve and high frequency resistance (HFR) of the AEMFC at 80° C. using the PDPC-6QA membrane (thickness=30 μm). Under $H_2/O_2$ conditions, the open circuit voltage of the cell reached >1.0 V. The peak power density was 1.35 W $cm^{-2}$. The HFR of the cell was ~0.065 Ω $cm^{-2}$, slightly higher than the cell using state-of-the-art AEMs (0.04 Ω $cm^{-2}$). FIG. 11B shows the AEM water electrolyzer performance of PDPC-6QA under pure water-fed conditions. A performance of 0.25 and 0.34 A $cm^{-2}$ at 1.9 V was achieved at 60 and 80° C. respectively. Under 1 M NaOH-fed conditions, 0.8 A $cm^{-2}$ was achieved at 1.8 V and 60° C., which based on previous results with the same ionomer suggests there is a limitation due to the membrane conductivity.

FIG. 12A is a photograph of a PDPC polymer as prepared according to the above description. FIG. 12B is a photograph of a PDPC-6QA polymer as prepared according to the above description, and is in the form of a film.

Phosphoric acid-doped polymers for high temperature proton exchange membrane applications In another application of the new polymers of the invention, a PDPC-6QA polymer was doped with phosphoric acid. This made the polymer proton-conducting, so as to be suitable for use in a high-temperature proton exchange membrane (PEM) fuel cell.

The PDPC-6QA membrane (45 mm thick) was doped with a phosphoric acid (PA) aqueous solution (85%) with three different doping conditions. i) 30 hours at room temperature, ii) 25 hours at 60° C. and iii) 25 hours at 80° C. For ionomeric binder, a blend polymer electrolyte of phosphonated poly(styrene) (PWN) and perfluorosulfonic acid was used. PWN synthesis is reported elsewhere. Briefly, polypentafluorostyrene, PFS (100 g, 515 mmol monomer units, Mw=200 kDa, PDI=3.4) was dispersed in dimethylacetamide, DMAc, (400 ml) at 140° C. for 1 h. Tris (trimethylsilsyl)phosphite, TMSP (200 g, 670 mmol) was added and the reaction mixture was then heated to 160° C. for 18 hrs. After the reaction was completed, the warm mixture was precipitated in 2 L water and collected via filtration. The resulting white powder was refluxed in water three times for 30 min each, exchanging water each time, followed by boiling in a 2 wt. % phosphoric acid solution. Washing with water until neutral and drying at 140° C. under vacuum for 18 hrs, yielded the phosphonated polymer with 66% degree of phosphonation, PWN66 (Yield: 138 g, 99%). Perfluoro sulfonic acid (Nafion D2020) was purchased from Ion Power.

Nafion D2020 was diluted with isopropyl alcohol to 5 wt %. For PWN dispersions, 5 wt % dispersions in N-methyl pyrrolidone were prepared at 100° C. The Nafion and PWN dispersion was mixed at the weight ratio of 4:6 through magnetic stirring and mild sonication.

Electrodes were prepared in a gas diffusion electrode (GDE) type by hand painting the catalyst ink on the CeTech GDL (W1S1009). Catalyst ink consists of 1.5 wt. % Pt/C catalyst for anode or cathode, 5.0 wt. % Nafion and PWN ionomer dispersion (5 wt. %). The catalyst ink was sonicated in ultrasonic bath for an hour and then painted onto the GDL which was set on a vacuum hotplate (80° C.). After painting the catalyst ink, the GDE was left on the vacuum plate for another 10 min to remove all the residual dispersing agent inside. The target platinum loadings of anode and cathode were 0.5 $mg_{Pt}$ $cm^{-2}$ and 0.8 $mg_{Pt}$ $cm^{-2}$, respectively, and the loading was confirmed with X-ray fluorescence (XRF) spectroscopy. The PA-doped PDPC-6QA membrane was sandwiched with prepared anode and cathode after blotting the excess PA on its surface.

HT-PEMFC performance was measured with a fuel cell station (Fuel Cell Technologies), after a break-in in the cell under constant voltage conditions. Two break-in processes were used (non-humidified and humidified). For the non-humidified break-in, the cell voltage of the cell decreased from 0.7 to 0.4 V at 5 hours of intervals. For the humidified break-in, the cell was exposed to water partial pressure of 47 kPa for 3 hours at 0.2 A/$cm^2$ and 160° C. under $H_2/O_2$ conditions after the non-humidified break-in. Polarization curves and high-frequency resistances (HFRs) of each MEA were recorded at a cell temperature of 160° C. and 10 psig back pressure under an $H_2$/air atmosphere with 500/500 sccm flow rate, and no external humidification was applied during the tests.

FIGS. 13A-13B show the effect of the break-in process on the performance of high-temperature proton exchange membrane fuel cells (HT-PEMFCs). The fuel cell performance of the membrane electrode assembly (MEA) after humidified break-in showed improved performance. Under $H^2$/oxygen conditions (FIG. 13A), the cell after the humidified break-in, the peak power density of the cell reached 760 mW $cm^{-2}$, ~140 mW $cm^{-2}$ higher than the cell after the non-humidified break-in. Under the $H^2$/air condition (FIG. 13B), the peak power density of the cell reached 500 mW $cm^{-2}$, 70 mW $cm^{-2}$ higher than the cell after the non-humidified break-in. The improved performance after the humidified break-in is related to the PA redistribution. The humidified break-in process helped redistribute PA in the electrode which increased the cell performance.

The effect of the doping process of the membrane was also investigated (FIG. 13C). For the comparison, the humidified break-in process was used for all samples. When using the 30-hour-room temperature doping process, the PA doping level was 3.12 mg $cm^{-2}$. The low doping level caused relatively high HFR (~0.12 Ohm $cm^2$). The peak power density of the cell was ~500 mW $cm^{-2}$. When using the 25 hours at 60° C., a doping level of 5.07 mg $cm^{-2}$ was obtained. The HFR was lowered to 0.09 Ohm $cm^2$, and the power density reached 590 mW $cm^{-2}$. When used the 25 hours at 80° C., the highest doping level was 6.32 mg $cm^{-2}$. Although low HFR (0.09 Ohm $cm^2$) was obtained, the fuel cell performance was lowest probably because of the electrode flooding. This result suggests that the PDPC-6QA membrane can be used for high-temperature fuel cells. After optimization of the doping level, the membrane enabled >550 mW $cm^{-2}$ under $H_2$/air and 160° C. conditions.

Alternative Routes of Synthesis

The above-described synthesis route is not the only method by which the polymers and AEMs of the invention may be obtained. FIG. 14 depicts one exemplary alternative synthesis route. In this example, rather than polymerizing the PDPC prior to addition of an alkyl-ammonium moiety, a halogenated alkyl moiety is added to the PDPC prior to polymerization. After polymerization, the PDPC polymer is reacted with an ammonium group, which replaces the halogen on the alkyl chain, forming a PDPC-QA polymer.

Synthesis of PDPC-2QA

PDPC-2QA (with two quaternized ammoniums added to the carbazole) was prepared according to the synthetic route shown in FIG. 14. The specific synthetic steps are depicted in FIG. 15A. A 3,6-diphenyl carbazole was reacted with 1,6-dibromohexane, in order to adhere a 6-bromohexane moiety to the nitrogen of the carbazole (compound 1). This compound was then polymerized by reaction with 1,1,1-trifluoropropan-2-one. The resulting polymer 2 was then reacted with a quaternized ammonium compound 3, to produce the depicted PDPC polymer 4 with two quaternized ammoniums bound. $^1$H NMR spectra for each of 1-4 are shown in FIGS. 15B-15E, respectively.

An exemplary synthetic scheme for a different PDPC-QA molecule, with a QA attached both to the carbazole and to the backbone, is depicted in FIG. 16. Starting after a 6-bromohexane moiety has already been bound to a 3,6-diphenyl carbazole (i.e., compound 2 from the previous scheme), the compound is polymerized with 7-bromo-1,1,1-trifluoroheptan-2-one, instead of 1,1,1-trifluoropropan-2-one. The resulting polymer has a terminally-bromo-substituted alkyl bound to both the nitrogen of the carbazole and to the quaternary carbon in the backbone of each repeating unit. This polymer is then reacted with trimethylamine, resulting in a quaternized ammonium group replacing each of the bromo substituents.

A similar exemplary scheme, shown in FIG. 17, can be used to product a PDPC with a QA bound only to the quaternary carbon in the backbone, but not the nitrogen of the carbazole. In this scheme, a 3,6-diphenyl carbazole without any moiety bound to its nitrogen is polymerized with 7-bromo-1,1,1-trifluoroheptan-2-one. The resulting polymer is then reacted with trimethylamine, resulting in a quaternized ammonium group replacing the bromo substituent.

CONCLUSION

Alkyl ammonium group-grafted polycarbazole homopolymers were prepared via acid-catalyzed Friedel Crafts polycondensation reaction. A nearly 100% grafting yield for the poly(carbazole) AEM with trimethylhexan-1-aminium side chain was obtained. The phenyl adsorption energy of carbazole is relatively low compared to other polyaromatic fragments due to the non-rotatable phenyl group. The alkaline stability of hexyl alkyl ammonium grafted polycarbazole is excellent and promising AEM devices' performance using the AEM showed a promising performance. Future work will focus on optimizing the conductivity and mechanical properties by controlling IEC.

What is claimed:

1. A polymer having the structure:

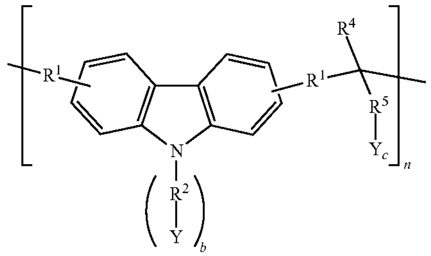

wherein each $R^1$ is independently a $C_6$-$C_{14}$ aryl;

$R^2$ is a $C_3$-$C_{24}$ alkyl;

$R^4$ is an unsubstituted, fluorinated, or perfluorinated $C_1$-$C_6$ alkyl;

$R^5$ is an unsubstituted, fluorinated, or perfluorinated $C_1$-$C_6$ alkyl;

Y is

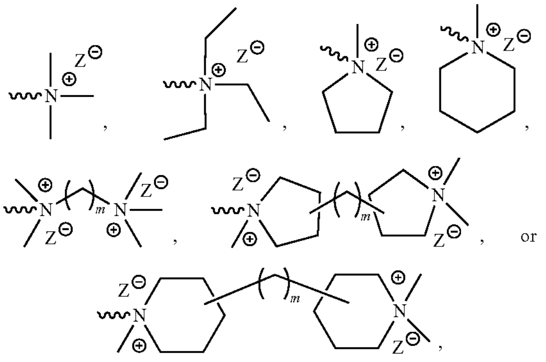

, , , , , , or , wherein Z is a counter ion, ∿ represents the point of attachment to the remainder of the polymer, and m is 4-12;

n is 2 to 100,000;

b is 0 or 1;

c is 0 or 1; and b+c=1 or 2.

2. The polymer of claim 1, having the structure

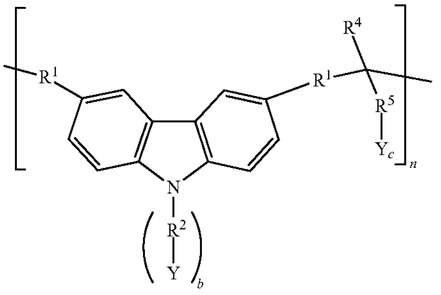

or

-continued

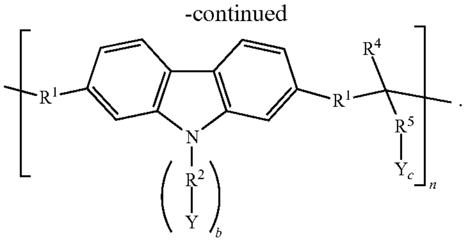

3. The polymer of claim 1, wherein each $R^1$ is a $C_6$-$C_{10}$ aryl.

4. The polymer of claim 3, wherein each $R^1$ is phenyl.

5. The polymer of claim 1, wherein $R^2$ is a $C_3$-$C_{12}$ alkyl.

6. The polymer of claim 5, wherein $R^2$ is a $C_6$ alkyl.

7. The polymer of claim 1, wherein Y is

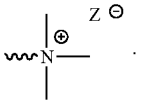

8. The polymer of claim 1, wherein Z is $OH^-$.

9. The polymer of claim 1, wherein $R^4$ is an unsubstituted, fluorinated or perfluorinated $C_1$-$C_3$ alkyl.

10. The polymer of claim 9, wherein $R^4$ is $CF_3$.

11. The polymer of claim 1, wherein $R^5$ is an unsubstituted, fluorinated, or perfluorinated $C_1$-$C_3$ alkyl.

12. The polymer of claim 11, wherein $R^5$ is $CH_3$.

13. The polymer of claim 1, wherein Z is selected from the group consisting of halides, $HCO_3^-$, and $OH^-$.

14. An anion exchange membrane comprising the polymer of claim 1.

15. The anion exchange membrane of claim 14, having a thickness of 10-200 μm.

16. A fuel cell or water electrolyzer, comprising the anion exchange membrane of claim 15.

17. The fuel cell or water electrolyzer of claim 16, further comprising:

i) a porous transport layer;

ii) an oxygen electrode catalyst layer, wherein a first face of said oxygen electrode catalyst layer is adjacent to a face of said porous transport layer, and a second face of said oxygen electrode catalyst layer is adjacent to a first face of said anion exchange membrane;

iii) a hydrogen electrode catalyst layer, wherein a first face of said hydrogen electrode catalyst layer is adjacent to a second face of said anion exchange membrane; and iv) a gas diffusion layer adjacent to a second face of said hydrogen electrode catalyst layer.

18. A method of preparing a polymer of claim 1, said method comprising:

i) reacting a compound having the structure

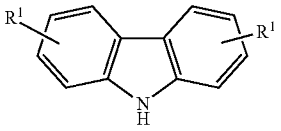

with a compound having the structure

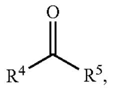

so as to form a polymer having the structure

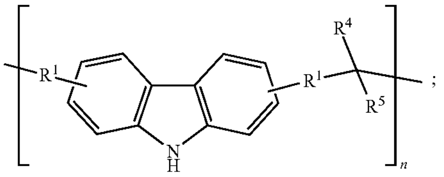

ii) reacting the polymer formed in step i) with a compound having the structure $$X—R^2—Y'',$$

wherein Y'' is,

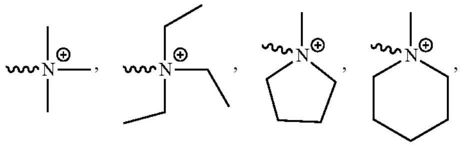

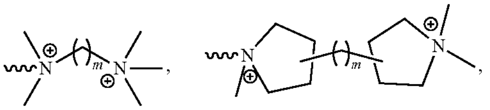

or

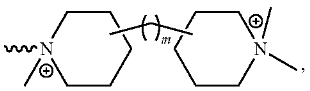

and m is 4-12, so as to form a polymer;

and iii) reacting the polymer formed in step ii) with a base or salt comprising a counter ion Z, so as to form the polymer of claim 1 having the structure

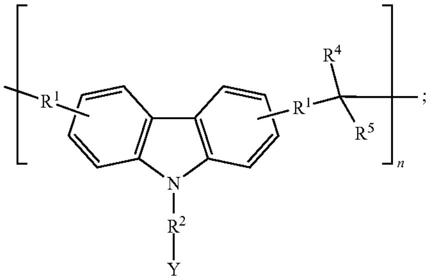

wherein X is a halogen.

19. A method of preparing a polymer of claim 1, said method comprising:

i) reacting a compound having the structure

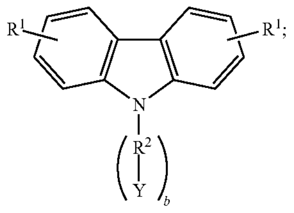

with a compound having the formula

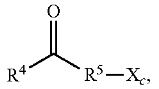

so as to form a polymer having the structure

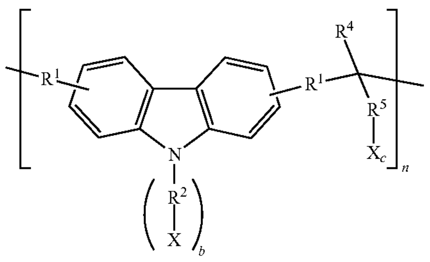

wherein each X is independently a halogen;

ii) reacting the polymer formed in step i) with Y', where Y' is

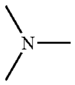,
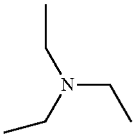,
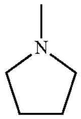,
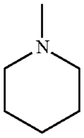,
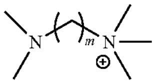,
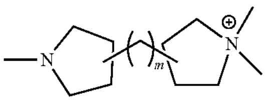, or
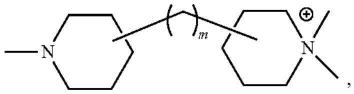, and m is 4-12, so as to form a polymer; and iii) reacting the polymer formed in step ii) with a base or salt comprising a counter ion Z, so as to form the polymer of claim 1 having the structure

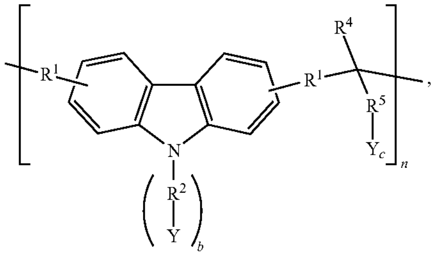, wherein b is 0 or 1;

c is 0 or 1; and b+c=1 or 2.

20. The method of claim 19, wherein $R^4$ is $CF_3$, $R^5$ is $(CH_2)_5Br$, and c is 1.

* * * * *